(12) United States Patent
Masuda

(10) Patent No.: US 10,280,113 B2
(45) Date of Patent: May 7, 2019

(54) GLASS MEMBER AND MANUFACTURING METHOD OF GLASS MEMBER

(71) Applicant: AGC Inc., Chiyoda-ku (JP)

(72) Inventor: Hidetaka Masuda, Haibara-gun (JP)

(73) Assignee: AGC Inc., Chiyoda-ku (JP)

( * ) Notice: Subject to any disclaimer, the term of this patent is extended or adjusted under 35 U.S.C. 154(b) by 246 days.

(21) Appl. No.: 15/158,944

(22) Filed: May 19, 2016

(65) Prior Publication Data

US 2016/0318796 A1 Nov. 3, 2016

Related U.S. Application Data

(63) Continuation of application No. PCT/JP2014/080896, filed on Nov. 21, 2014.

(30) Foreign Application Priority Data

Nov. 26, 2013 (JP) ................. 2013-244136

(51) Int. Cl.
*C03C 21/00* (2006.01)
*C03C 17/32* (2006.01)
(Continued)

(52) U.S. Cl.
CPC ............ *C03C 21/002* (2013.01); *B23K 26/53* (2015.10); *C03B 33/0222* (2013.01); *C03C 17/32* (2013.01); *G02B 5/208* (2013.01); *G02B 5/22* (2013.01); *G02B 5/223* (2013.01); *Y02P 40/57* (2015.11)

(58) Field of Classification Search
None
See application file for complete search history.

(56) References Cited

U.S. PATENT DOCUMENTS

2013/0202715 A1* 8/2013 Wang .................. C03C 3/095
424/618

FOREIGN PATENT DOCUMENTS

EP 2 684 897 A1 1/2014
JP 2006-131482 5/2006
(Continued)

OTHER PUBLICATIONS

International Preliminary Report on Patentability and Written Opinion dated Jun. 9, 2016 in PCT/JP2014/080896 (submitting English Translation only).
(Continued)

*Primary Examiner* — David Sample
(74) *Attorney, Agent, or Firm* — Oblon, McClelland, Maier & Neustadt, L.L.P.

(57) ABSTRACT

There are provided a manufacturing method of a glass member capable of being cut well without causing a decrease in strength even by using laser light to form a reformed region inside a glass and cutting the glass along the reformed region, and a glass member obtained by the manufacturing method. A glass member 100 having, as a main body thereof, a glass substrate 110 including: strengthened principal surfaces 110*a* and an end surface; a reformed region R formed on the end surface made by light radiated to be focused thereto, in which a tension stress (CT) of a center portion in a tension stress region, a fracture toughness ($K_{1c}$) of the glass substrate, and a crack initiation load (CIL) of the glass substrate satisfy a predetermined expression.

20 Claims, 7 Drawing Sheets

(51) Int. Cl.
    *C03B 33/02*     (2006.01)
    *G02B 5/20*     (2006.01)
    *G02B 5/22*     (2006.01)
    *B23K 26/53*     (2014.01)

(56) References Cited

FOREIGN PATENT DOCUMENTS

| | | | | |
|---|---|---|---|---|
| JP | 2009-135342 | 6/2009 | | |
| JP | 2010008497 A | * | 1/2010 | |
| JP | 2010-264471 | 11/2010 | | |
| JP | 2011-084423 | 4/2011 | | |
| JP | 2013-075802 | 4/2013 | | |
| TW | 201329005 A1 | 7/2013 | | |
| WO | WO-2010021746 A1 | * | 2/2010 | ............. C03C 3/083 |
| WO | WO 2013/047157 A1 | 4/2013 | | |

OTHER PUBLICATIONS

Extended European Search Report dated Apr. 22, 2016 in Patent Application No. 13834932.9.
International Search Report dated Feb. 24, 2015 in PCT/JP2014/080896, filed on Nov. 21, 2014 ( with English Translation).
Written Opinion dated Feb. 24, 2015 in PCT/JP2014/080896, filed on Nov. 21, 2014.

* cited by examiner

GLASS MEMBER AND MANUFACTURING METHOD OF GLASS MEMBER

CROSS-REFERENCE TO RELATED APPLICATIONS

This application is a continuation of prior International Application No. PCT/JP2014/080896 filed on Nov. 21, 2014 which is based upon and claims the benefit of priority from Japanese Patent Application No. 2013-244136 filed on Nov. 26, 2013; the entire contents of all of which are incorporated herein by reference.

FIELD

Embodiments described herein generally relate to a glass member having strengthened principal surfaces and a manufacturing method thereof, and particularly to a glass member cut into a desired shape by laser light and a manufacturing method thereof.

BACKGROUND

As a cutting method of a semiconductor substrate and the like, Stealth Dicing (registered trademark) has been known (JP-A 2009-135342). This cutting method is a technique in which laser light with a wavelength passing through a semiconductor substrate (for example, silicon (Si)) is collected inside the semiconductor substrate to form a reformed region (flaw region) inside the semiconductor substrate, and then an external stress such as a tape expansion is applied to cause a crack in the semiconductor substrate starting from the reformed region and cut the semiconductor substrate.

This cutting method enables the reformed region to be locally and selectively formed inside the semiconductor substrate without damaging a principal surface of the semiconductor substrate, and therefore it is possible to reduce occurrence of defects such as chipping and the like on the principal surface of the semiconductor substrate that is a problem in general blade dicing. In addition, there are fewer problems such as dust occurrence unlike machining. Therefore, in recent years, the above-described cutting method becomes to be widely used not only in cutting the semiconductor substrate but also in cutting a glass plate.

SUMMARY

When a glass plate is cut using the above-described laser light, the laser light is used to scan a planned cutting line to thereby form a reformed region inside the glass plate. However, when a strengthened glass is used as this glass plate, cutting sometimes cannot be performed well under the same condition as that of an unstrengthened glass plate because a compressive stress layer is formed on surfaces of the glass plate and a tension stress layer corresponding to them is formed inside the glass plate. Further, a resin layer is sometimes provided on a principal surface of a substrate in order to give an optical function and other functions to this glass plate, and in this case, the resin layer also has to be cut into a desired shape at a desired position simultaneously, resulting in making cutting of the glass plate further difficult.

When cutting is insufficient, making cutting easier is considered by increasing a laser output, but in this case, a reformed region in the glass increases and an edge line of the glass after cutting (a boundary between a principal surface and a side surface of the glass) tends to be rough, and in the case of the rough edge line, there is a problem that strength of the glass after cutting decreases.

Thus, an object of the present invention is to provide a glass member that is cut well by using laser light to form a reformed region inside a strengthened glass and cutting the glass along the reformed region, and a manufacturing method of a glass member capable of being cut well by the above-described cutting method without causing a decrease in strength.

As a result that the present inventors variously examined a method for efficiently cutting even the strengthened glass as above without a decrease in strength of a glass member after cutting, they found out that the above-described object can be achieved by making a tension stress (CT) formed inside a glass substrate, a fracture toughness ($K_1$) of the glass substrate, an a crack initiation load (CIL) of the glass substrate satisfy a predetermined relation.

That is, a glass member of the present invention comprising a glass substrate including a strengthened principal surface and an end surface; and a reformed region formed on the end surface made by light radiated to be focused thereto, wherein the glass substrate satisfies the following expression (1), $$\left[ a \times K_{lc} \times \left\{ \frac{2}{\pi} \left( \frac{K_{lc}}{CT} \right)^2 \times 10^6 \right\}^{\frac{3}{2}} \right]^{\frac{2}{b+1}} > 3 \times CIL \quad (1)$$

where CT is a tension stress of a center portion in a tension stress region formed in a plate thickness direction inside of the glass substrate by the strengthening, $K_{1c}$ is a fracture toughness of the glass substrate, CL is a crack initiation load of the glass substrate, a represents a positive number of 0.4 to 7, and b represents an integer of 2 to 7.

Further, a manufacturing method of a glass member of the present invention comprising: performing strengthening on principal surfaces of the glass plate to satisfy the following expression (1), $$\left[ a \times K_{lc} \times \left\{ \frac{2}{\pi} \left( \frac{K_{lc}}{CT} \right)^2 \times 10^6 \right\}^{\frac{3}{2}} \right]^{\frac{2}{b+1}} > 3 \times CIL \quad (1)$$

where CT is a tension stress of a center portion in a tension stress region formed in a plate thickness direction inside of a glass plate by performing strengthening, $K_{1c}$ is a fracture toughness of the glass plate, CIL is a crack initiation load of the glass plate, a represents a positive number of 0.4 to 7, and b represents an integer of 2 to 7; forming selectively a reformed region by light radiated to be focused inside the glass plate; and cutting the glass plate along the reformed region.

According to a glass member and a manufacturing method thereof of the present invention, even a strengthened glass member can be obtained by being cut into a desired sized shape. Then, the glass member obtained as above can improve product reliability because a decrease in bending strength of the glass member is suppressed due to a smoothly cut surface.

DETAILED DESCRIPTION

Hereinafter, there will be explained a glass member and a manufacturing method of a glass member according to embodiments in detail with reference to the drawings.

First Embodiment

Glass Member

Figure 1A:
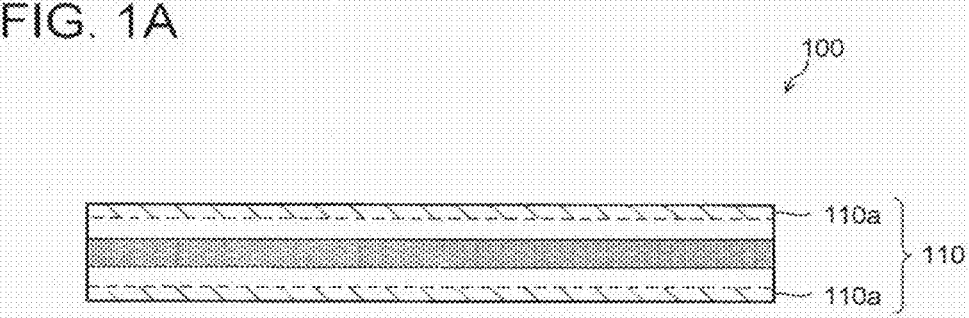
FIG. 1A is a side view of a glass member according to a first embodiment.

FIG. 1A illustrates a side view of a glass member 100 according to a first embodiment of the present invention. As illustrated in FIG. 1A, the glass member 100 according to this embodiment is made of a glass substrate 110 to be a base thereof, and the glass substrate 110 includes, on principal surfaces of the substrate, compressive stress layers 110a formed by strengthening. Incidentally, in this embodiment, the glass substrate 110 itself is the glass member 100, and the glass member 100 and the glass substrate 110 are synonymous with each other.

<Glass Substrate>

The glass substrate 110 is a plate-shaped glass, and includes, on its principal surfaces, compressive stress layers 110a formed by strengthening, and correspondingly to them, includes a tension stress region where a tension stress (CT) acts formed in a plate thickness direction inside of the glass substrate 110. Further, the glass substrate 110 includes a cut surface cut along a reformed region R selectively formed therein by laser light radiated to be focused inside the glass.

As a strengthening method to form the compressive stress layer 110a on the principal surface of the glass, an air-cooling tempering method (physical tempering method) and a chemical strengthening method have been known as a representative example. The air-cooling tempering method (physical tempering method) is a method to rapidly cool by air cooling or the like a glass plate principal surface heated up to a temperature near a softening point. Further, the chemical strengthening method is a method to replace alkali metal ions (typically, Li ions, Na ions) having a smaller ion radius existing on a glass plate principal surface with alkali ions (typically, Na ions or K ions for Li ions, or K ions for Na ions) having a larger ion radius by ion exchange at temperatures equal to or lower than a glass transition point.

This embodiment may use either of the strengthening methods. However, in the case of a glass plate having such a thin thickness as the thickness of the glass substrate 110 becomes 2 mm or less, for example, it is difficult to form the compressive stress layer because it is not easy to secure a difference in temperature between the principal surface and the inside caused by air-cooling strengthening. Further, the air-cooling strengthening sometimes causes a case that flatness of the glass plate is impaired because of variations in cooling temperature. Particularly, the glass plate having a thin thickness has a tendency that the flatness is impaired, so that the glass is preferably strengthened by the latter chemical strengthening method in such a case.

In the glass substrate 110 used in this embodiment, the glass principal surfaces are strengthened and respective characteristics of the glass satisfy a predetermined relation, and therefore, even when a laser light output for forming the reformed region R is decreased to make cracks to be a starting point of cutting small, the glass substrate 110 can be cut, resulting in that it is possible to obtain a glass that has high linearity of an edge line between a cut surface and each principal surface and has a high mechanical strength.

Then, the predetermined relation satisfied by the glass substrate 110 is that of the glass substrate 110, a fracture toughness ($K_{1c}$) [MPa·m$^{1/2}$], and a tension stress (CT) [MPa] of a center portion of the tension stress region, and a crack initiation load (CIL) [kgf] satisfy the following expression (1).

$$\left[a \times K_{lc} \times \left\{\frac{2}{\pi}\left(\frac{K_{lc}}{CT}\right)^2 \times 10^6\right\}^{\frac{3}{2}}\right]^{\frac{2}{b+1}} > 3 \times CIL \quad (1)$$

where, "a" represents a positive number of 0.4 to 7 and "b" represents an integer of 2 to 7.

This expression (1) is an index of suppression of the glass plate being cut deviating from a planned cutting line of the glass substrate 110, and when the value of the left side exceeds (3×CIL) µJ/pulse, cutting can be performed without deviating from the planned cutting line to obtain the glass substrate 110. Incidentally, the planned cutting line is a plane pattern for dividing the glass substrate 110 into desired sized and numbered pieces, and the reformed region R is formed in the glass plate being a material along the planned cutting line in a plan view. Further, in the description of the present application, the fracture toughness ($K_{1c}$) and the crack initiation load (CIL) mean characteristics of the glass before strengthening.

Incidentally, "a" and "b" in the above-described expression (1) are numbers to vary according to the kind of glass used for the glass substrate 110 and a wavelength of used laser light, and for example, in the case of a borosilicate glass used in Examples (a wavelength of used laser light of 532 nm), "a" is 1.83 and "b" is 4, and in the case of an aluminosilicate glass (a wavelength of used laser light of 532 nm), "a" is 1.55 and "b" is 4. Further, in the case of a soda lime glass (a wavelength of used laser light of 532 nm), "a" is 1.85 and "b" is 4.

The coefficient a in the above-described expression (1) and later-described expression (2), (3), and expression (b), (c) is calculated by a method to be described below. The coefficient a can be calculated by using either of a method to perform calculation using physical properties of the glass substrate 110 or a method to perform calculation using experiment data.

The method to calculate the coefficient a using physical properties of the glass substrate 110 uses the following expression (a).

$$a = 2.5 \times 10^5 \times \sqrt{\frac{\rho c}{\alpha E^2}} \quad \text{(a)}$$

where, ρ represents density [kg/μm³], c represents specific heat [μJ/kg·K], α represents thermal expansion coefficient [1/K], and E represents Young's modulus [MPa].

Besides, the method to perform calculation using experiment data is performed by the following procedures.

A plurality of glass plates 10 (size: 50 mm×50 mm, thickness: 0.15 to 0.3 mm) are prepared. Incidentally, the glass plate 10 means a glass before being cut, which becomes a material of the glass substrate 110, and is synonymous with a glass plate 10 used in a manufacturing method of a later-described glass member 100 (see FIG. 2A to FIG. 2C, and so on). That is, in the present invention, the glass plate 10 includes compressive stress layers formed on its principal surfaces.

Strengthening is performed on the glass plates to obtain the glass plates 10 including different strengthening characteristics (the range of CT is within a range of 30 MPa to 150 MPa at intervals of 10 to 30 MPa).

A reformed region is formed in the plate thickness direction center of the strengthened glass plates 10. On this occasion, nine lines are laser processed into a strip with a 5 mm width while changing laser energy by 0.5 μJ/pulse for each one line. Next, after one minute since the processing, the lines are each confirmed whether a crack has reached the surface at the entire line. Then, among laser energy conditions under which a crack has reached the surface at the entire line, the lowest laser energy condition is obtained as the lowest laser energy capable of cutting the glass plate 10.

Next, in the same manner as the above, the lowest laser energy (e) capable of cutting the glass plates 10 having different strengthening characteristics (CT) is calculated by the following expression (b).

$$e = \left[ a \times K_{1c} \times \left\{ \frac{1}{\pi} \left( \frac{K_{1c}}{CT} \right)^2 \times 10^6 \right\}^{\frac{3}{2}} \right]^{\frac{2}{b+1}} \quad \text{(b)}$$

Then, each of the lowest laser energy calculated by the experiment and the lowest laser energy calculated using the expression (b) are plotted on a graph to find the coefficient a satisfying a slope of a linear approximation made of the plots being "1.0".

The coefficient b of the above-described expression (1) and the later-described expressions (2), (3) and expressions (b), (c) will be calculated by a method to be described below.

When the reformed region is formed by radiating laser light to the inside of the glass, a multiphoton absorption phenomenon is required to occur. The multiphoton absorption phenomenon requires that "b×hv" (where, h: Planck's constant, v: laser light frequency=velocity of light/wavelength) exceeds an "energy band gap (Eg)." Here, the smallest b (integer) that establishes the relation of "Eg"<"b×hv" is set to the coefficient b. Incidentally, in the invention of the present application, the wavelength of the laser light to be used is 532 nm, and in this case, hv is 2.33 eV and Eg of the glass is about 8 eV, so that "b" becomes 4.

The coefficient a (positive number) in the above-described expression (1) and the later-described expressions (2), (3) and expressions (b), (c) is preferable to be 1 to 3, and more preferable to be 1 to 2. Further, the coefficient b (integer) is preferable to be 2 to 5, and more preferable to be 3 to 5.

Hereinafter, there will be explained characteristics of the glass substrate 110. First, the depth of the compressive stress layer 110a formed on the principal surfaces of the glass (DOL) is preferable to be 10 μm or more, more preferable to be 12 μm or more, and further preferable to be 15 μm or more. On the other hand, DOL is preferably set to 70 μm or less in order to make the glass likely to be cut after strengthening.

Further, the thickness of the tension stress region formed in the plate thickness direction inside of the glass substrate 110 (the plate thickness of the glass substrate 110—the depth of the compressive stress layer (DOL)×2) is preferable to be 30 μm or more and more preferable to be 50 μm or more.

Further, in the glass substrate 110 used in this embodiment, a compressive stress value (CS) formed on the principal surfaces of the glass is preferable to be 200 MPa or more, more preferable to be 300 MPa or more, and further preferable to be 400 MPa or more. On the other hand, when CS becomes too high, the tension stress inside the glass may become high extremely, so that CS is preferably set to 900 MPa or less and more preferably set to 750 MPa or less.

The compressive stress value (CS) and the depth of the compressive stress layer (DOL) formed on the principal surfaces of the glass substrate 110 can be calculated by observing the number of interference fringes and each interval therebetween, using a device for measuring surface stress (FSM-6000 manufactured by ORIHARA INDUSTRIAL co., ltd.). Further, the tension stress (CT) formed inside the glass substrate 110 is calculated by the following expression using CS and DOL that are measured above.

CT=(CS×DOL)/(t−2×DOL)

Incidentally, t represents the plate thickness (μm) of the glass substrate 110.

Figure 1B:
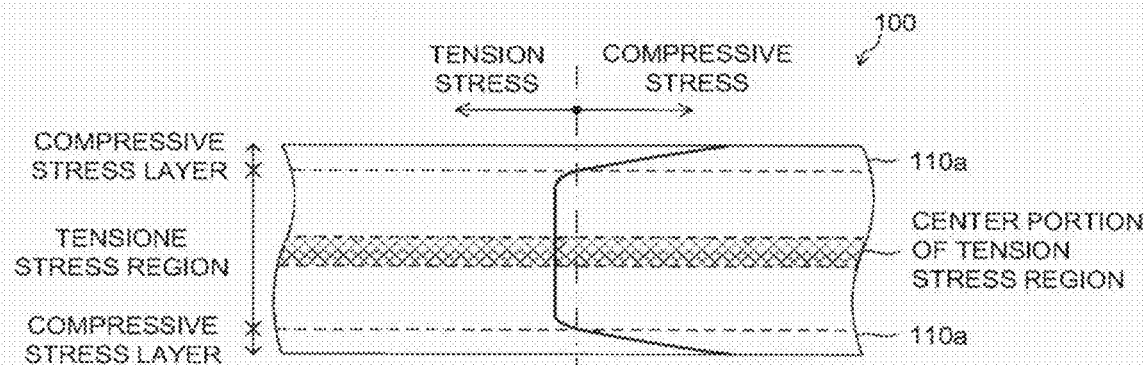
FIG. 1B is a schematic explanatory view of stresses to act in the glass member in FIG. 1A.

FIG. 1B is a view to schematically explain stresses to act in the glass member in FIG. 1A. In the glass substrate 110 used in the present invention, as illustrated in FIG. 1B, the tension stress region where the tension stress (CT) acts is formed in the plate thickness direction inside of the glass correspondingly to the compressive stress layers 110a formed on the surfaces. In the tension stress region formed here, the tension stress of the center portion of the tension stress region is preferable to be 50 MPa or more. Thereby, a glass having a higher mechanical strength can be obtained. CT is more preferable to be 70 MPa or more and further preferable to be 90 MPa or more. On the other hand, in the case that CT becomes high extremely, a risk of the glass being damaged naturally increases when forming the reformed region by laser light, so that CT is preferably set to 200 MPa or less. It is more preferably 180 MPa or less and further preferably 160 MPa or less. By making CT fall within a range of 50 MPa to 200 MPa as described above, cutting of the glass plate 10 can be performed well when manufacturing the strengthened glass substrate. Incidentally, CT explained in the present description is a value of the center portion of the tension stress region and the above center portion matches the center portion of the glass substrate 110 generally, but when the compressive stresses formed on the surfaces of the glass substrate 110 are different between the front surface and the rear surface, the center portion is sometimes positioned in a region closer to the principal surface side where the compressive stress is small. Further, CT indicates the maximum tension stress in the tension stress region generally.

Further, even when CT is less than 50 MPa, the effect of decreasing the laser output for cutting the glass can be obtained and there is a case that an advantage of reducing the number of times of scanning with the laser light on the same planned cutting line is obtained, but bending strength of the glass after cutting does not become high significantly compared to an unstrengthened glass. Therefore, CT is preferable to be 50 MPa or more.

Further, in the glass substrate 110 used in this embodiment, the fracture toughness ($K_{1c}$) is preferably within a range of 0.2 MPa·m$^{1/2}$ to 0.90 MPa·m$^{1/2}$ or the thermal expansion coefficient is preferably within a range of 65×10$^{-7}$/K to 150×10$^{-7}$/K. The fracture toughness ($K_{1c}$) of the glass substrate 110 is a value ($K_{1c}$) calculated by the following expression in the Indentation Fracture method (IF method) defined by JIS R1607.

$$K_{1c} = 0.026 \cdot E^{1/2} \cdot P^{1/2} \cdot a/C^{3/2}$$

where, E represents Young's modulus (Pa), P represents indentation load (N), a represents 1/2 (m) of the average of an indentation diagonal line length, and C represents 1/2 (m) of the average of a crack length.

Further, the thermal expansion coefficient of the glass substrate 110 is an average value of values measured by a differential expression defined by JIS R3102 and measured at 100° C. to 300° C.

Further, in the glass substrate 110 used in this embodiment, when the thermal expansion coefficient of the glass substrate 110 is less than 65×10$^{-7}$/K, cracks are unlikely to occur in the reformed region R at the time of forming the reformed region R in the glass plate 10 before cutting by laser light, resulting in difficulty in cutting the glass plate 10. Further, even if the cracks occurring in the reformed region R are formed to be large so as to sufficiently extend, cracks extending in directions other than the plate thickness direction become large, resulting in a rough cut surface of the glass member 100 after cutting. This may decrease the dimensional accuracy and the bending strength of the glass member 100.

On the other hand, when the thermal expansion coefficient of the glass substrate 110 exceeds 150×10$^{-7}$/K, cracks are likely to occur in the reformed region at the time of forming the reformed region R in the glass plate 10 by laser light, and therefore, unintended cracks become likely to occur spontaneously toward the surface of the glass plate 10 from the reformed region R by the tension stress formed inside the glass plate 10. These unintended cracks extend in a direction different from the planned cutting line, and therefore there is sometimes a case that the glass substrate 110 after cutting cannot be obtained as a desired shaped glass substrate.

The thermal expansion coefficient of the glass substrate 110 is further preferable to be 70×10$^{-7}$/K to 140×10$^{-7}$/K.

Further, in the glass substrate 110 used in this embodiment, when the fracture toughness ($K_{1c}$) of the glass substrate 110 exceeds 0.90 MPa·m$^{1/2}$, cracks are unlikely to occur in the reformed region R at the time of forming the reformed region R in the glass plate 10 by laser light, resulting in difficulty in cutting the glass plate 10. Further, at the time of cutting the glass plate 10 starting from the reformed region R, cracks are unlikely to extend in the plate thickness direction, so that the glass plate 10 is forcedly cut, resulting in that there is sometimes a case that the cut surface of the glass substrate 110 becomes rough and the dimensional accuracy becomes poor. Further, even if the cracks occurring in the reformed region R are formed to be large so as to sufficiently extend, cracks extending in directions other than the plate thickness direction become large, resulting in that there is sometimes a case that the cut surface of the glass substrate 110 after cutting becomes rough. This may decrease the dimensional accuracy and the bending strength of the glass substrate 110.

On the other hand, when the fracture toughness ($K_{1c}$) of the glass substrate 110 is less than 0.2 MPa·m$^{1/2}$, cracks are likely to occur in the reformed region at the time of forming the reformed region R in the glass plate 10 by laser light, and therefore, unintended cracks become likely to occur spontaneously toward the surface of the glass plate 10 from the reformed region R by the tension stress formed inside the glass plate 10. These unintended cracks extend in a direction different from the planned cutting line, and therefore there is sometimes a case that the glass substrate 110 after cutting cannot obtain a desired shaped glass. The fracture toughness ($K_{1c}$) of the glass substrate 110 is further preferable to be 0.3 MPa·m$^{1/2}$ to 0.8 MPa·m$^{1/2}$.

Further, in the glass substrate 110 in this embodiment, the crack initiation load (CIL) of the glass substrate is preferable to be 1 gf to 2 kgf. When the crack initiation load (CIL) is less than 1 gf, the glass substrate is flawed even with a slight load, to thus fail to be used practically. Further, when this crack initiation load (CIL) is greater than 2 kgf, the laser energy necessary for occurrence of cracks increases. The crack initiation load (CIL) is more preferable to be 2 gf to 1.5 kgf.

Here, the "crack initiation load (CIL)" is found by the following method. First, a plate-shaped glass whose both surfaces are mirror-polished is prepared. By using a Vickers hardness testing machine, a Vickers indenter (with a tip portion whose angle is 136°) is pushed in for 15 seconds and thereafter is removed, and the vicinity of an indentation is observed 15 seconds later. In the observation, it is examined how many cracks have occurred from a corner of the indentation. In the measurement, an indentation is formed at ten places, which are sufficiently separated from one another, of the single glass under each of indentation loads 1 gf (0.0098 N), 2 gf (0.0196 N), 5 gf (0.049 N), 10 gf (0.0981 N), 20 gf (0.196 N), 50 gf (0.49 N), 100 gf (0.981 N), 200 gf (1.961 N), 300 gf (2.941 N), 500 gf (4.903 N), 1 kgf (9.807 N), 2 kgf (19.61 N), and 5 kgf (49.03 N) of the Vickers indenter. An average value of the number of cracks that have occurred is calculated for each load, and a relation of the load and the number of cracks is found by regression calculation by using a sigmoid function. From the result of the regression calculation, the load value at which the number of cracks becomes two is defined as the value (gf) of the crack initiation load (CIL). Incidentally, an atmosphere condition of the measurement is that the air temperature is 25° C. and the humidity is about 40%.

Then, the glass substrate 110 is that among the above-explained characteristics of the glass, the tension stress (CT) of the center portion in the tension stress region formed in the plate thickness direction inside, the fracture toughness ($K_{1c}$), and the crack initiation load satisfy the above-described expression (1). By satisfying this expression (1), when manufacturing the glass substrate 110 by cutting the glass plate by a laser reforming process, cutting along the planned cutting line can be performed, the linearity of the edge line between the cut surface and each of the principal surfaces can be increased, and the strength of the glass substrate 110 can be improved.

Further, the glass substrate 110 used in this embodiment has a cut surface cut along the reformed region R selectively formed therein by laser light. That is, the glass substrate 110 is obtained as a result that the reformed region R is formed inside the glass plate 10 by laser light so that the glass plate 10 before cutting becomes a desired shape and size, and force is externally applied to thereby cut the glass plate 10 along the reformed region R, and therefore, this glass substrate 110 has a side surface on which the reformed region R is exposed and has a cut surface cut along the reformed region R in the plate thickness direction of the glass.

At this time, the reformed region R is formed not in the compressive stress layer 110a but in the tension stress region inside the glass plate (the region including the center portion in the plate thickness direction of the glass plate). Incidentally, the width of the reformed region R in the plate thickness direction of the glass substrate 110 is preferable to be smaller than that of the tension stress region.

Incidentally, this reformed region R is generally formed in the center portion of the tension stress region (near the center of the glass substrate 110 in the plate thickness direction normally), but the formation of the reformed region R is not limited to it, and the reformed region R may also be formed in closer region to either principal surface side of the glass substrate 110. For example, when the reformed region R is made in closer region to one principal surface side from the plate thickness center portion on the cross section of the glass substrate 110, less waviness of cut line (in a plan view) is seen at the other principal surface side, so that it is preferable. When the reformed region R is made to exist unevenly at this time, the center portion of the tension stress region is also made to exist unevenly, resulting in that the center portion and the reformed region R are preferably formed at the same position.

Further, the fracture toughness ($K_{1c}$) [MPa·m$^{1/2}$] of the glass substrate and the tension stress (CT) [MPa] of the center portion of the above-described tension stress region preferably satisfy the following expression (2).

$$\left[a \times K_{1c} \times \left\{\frac{2}{\pi}\left(\frac{K_{1c}}{CT}\right)^2 \times 10^6\right\}^{\frac{3}{2}}\right]^{\frac{2}{b+1}} - \left[a \times K_{1c} \times \left\{\frac{1}{\pi}\left(\frac{K_{1c}}{CT}\right)^2 \times 10^6\right\}^{\frac{3}{2}}\right]^{\frac{2}{b+1}} > 1.0 \quad (2)$$

where, "a" represents a positive number of 0.4 to 7 and "b" represents an integer of 2 to 7.

This expression (2) takes the difference between a calculation expression to be an index of suppression of the glass plate being cut deviating from the planned cutting line of the glass substrate 110 and a calculation expression being an index indicating easiness of cutting when forming the glass substrate 110. At this time, when the difference exceeds 1.0 µJ/pulse, it indicates that an application range of a reforming condition capable of performing cutting easily without the glass substrate 110 being cut deviating from the planned cutting line is wide and the degree of freedom of setting a treatment condition is sufficiently high, and manufacture of the glass member can be performed stably. When this difference is 1.0 µJ/pulse or less, due to variations in the CT value and a laser output error that can occur during manufacture, cutting is performed deviating from the planned cutting line or cutting itself cannot be performed, and therefore there is sometimes a case that setting of the reforming condition capable of stably cutting the glass substrate 110 becomes hard, resulting in difficulty in performing stable manufacture of the glass member. Here, "a" and "b" mean the same contents as those of the above-described relational expression (1). The expression (2) is preferable to be 1.5 or more and further preferable to be 2.0 or more.

Incidentally, the left term (first term) of the left side of the expression (2) is an index of suppression of the glass plate being cut deviating from the planned cutting line of the glass substrate 110, and means the maximum (upper limit of) laser energy capable of cutting the glass substrate 110 having different strengthening characteristics (CT) without deviating from the planned cutting line and is indicated as an index value A in Examples. Further, the right term (second term) of the left side of the expression (2) is an index indicating easiness of cutting when forming the glass substrate 110 and means the lowest laser energy (e) capable of obtaining the glass substrate 110 including different strengthening characteristics (CT) by cutting and is indicated as an index value B in Examples. Therefore, the expression (2) means that the difference between the index value A and the index value B (index value [A–B]) satisfies 1.0 or more.

Further, the fracture toughness ($K_{1c}$) [MPa·m$^{1/2}$] of the glass substrate and the tension stress (CT) [MPa] of the center portion of the above-described tension stress region preferably satisfy k<1 in the following expression (3).

$$\left[a \times K_{1c} \times \left\{\frac{1}{\pi}\left(\frac{K_{1c}}{CT}\right)^2 \times 10^6\right\}^{\frac{3}{2}}\right]^{\frac{2}{b+1}} < k \left\{a \times K_{1c} \times \left(\frac{t}{2}\right)^{\frac{3}{2}}\right\}^{\frac{2}{b-1}} \quad (3)$$

where "a" represents a positive number of 0.4 to 7 and "b" represents an integer of 2 to 7.

The left side of the expression (3) is the same as the right term (second term) of the left side of the expression (2), and is a calculation expression to be an index indicating easiness of cutting when forming the glass substrate 110. Further, the right side of the expression (3) is the resultant obtained by multiplying the lowest laser energy capable of cutting an unstrengthened glass by a coefficient k.

Setting the coefficient k to less than 1 makes it possible to lower the energy of laser light at the time of cutting the strengthened glass using laser light compared to the case of cutting an unstrengthened glass. This makes it possible to make the cracks remaining in a glass inside direction from the cut surface small and increase end surface bending strength of the strengthened glass after cutting compared to an unstrengthened glass. Particularly, setting the coefficient k to 0.5 or less makes it possible to increase the end surface bending strength of the strengthened glass after cutting by 200 MPa or more compared to an unstrengthened glass.

Further, the compressive stress (CS) [MPa] of a compressive stress region formed on the surfaces of the glass substrate 110 and the depth of the compressive stress layer (DOL) [µm] preferably satisfy the following expression (4).

$$\frac{CS \times DOL}{1000} \le 30 \quad (4)$$

This expression (4) indicates the index of suppression of the glass plate 10 being cut deviating from the planned cutting line of the glass substrate 110 from a point of view different from the above, and when this expression is satisfied, occurrence of an oblique pattern on the cut surface can be suppressed and strength of the glass substrate 110 (4-point bending strength after cutting the glass) can be secured sufficiently when cutting can be performed without deviating from the planned cutting line. Incidentally, the expression (4) is more preferable to be 25 or less.

Here, the "oblique pattern" means a crack to occur in a region other than the reformed region observed on the cut surface of the glass substrate 110, and when a large number of cracks occur, the strength of the glass substrate 110 itself decreases and cracking occurs inside the glass substrate 110 without acting of a special external force, resulting in that the glass substrate 110 cannot used as a glass member.

The glass substrate 110 can be used by appropriately selecting from materials transparent in a visible wavelength region. For example, a borosilicate glass is processed easily and can suppress occurrence of flaws, foreign matters, and the like on an optical surface, thus being preferable, and an alkali aluminosilicate glass containing an alkali component is chemically strengthened, to make it easier to form the tension stress region inside the glass substrate 110, thus being preferable.

Concrete examples of the borosilicate glass include one containing, in mass %, 60 to 85% of $SiO_2$, 1 to 10% of $Al_2O_3$, 7 to 20% of $B_2O_3$, 0 to 15% of $Na_2O$, 0 to 15% of $K_2O$, 0 to 15% of $Li_2O$, 1 to 15% of $\Sigma M_2O$ (M representing Li, Na, and K), and 0 to 18% of $\Sigma M'O$ (M' representing Mg, Ca, Sr, Ba, and Zn). Here, $\Sigma M_2O$ represents the total amount of $M_2O$ and $\Sigma M'O$ represents the total amount of M'O.

Concrete examples of the alkali aluminosilicate glass containing an alkali component include one containing, in terms of molar percentage on the following oxide basis, 55 to 80% of $SiO_2$, 3 to 16% of $Al_2O_3$, 0 to 12% of $B_2O_3$, 5 to 16% of $Na_2O$, 0 to 15% of $K_2O$, 0 to 15% of $Li_2O$, 0 to 15% of MgO, 0 to 3% of CaO, and 0 to 18% of $\Sigma M'O$ (M' representing Mg, Ca, Sr, Ba, and Zn). Here, $\Sigma M'O$ represents the total amount of M'O.

Further, as the glass to be used here, a fluorophosphate-based glass or a phosphate-based glass can also be used. Particularly, the fluorophosphate-based glass or phosphate-based glass having had CuO added thereto has high transmittance to light of a visible wavelength region, and CuO sufficiently absorbs light of a near-infrared wavelength region, and therefore the fluorophosphate-based glass or phosphate-based glass can be preferably used as a glass provided with a good near-infrared cut function.

Concrete examples of the fluorophosphate-based glass containing CuO include one containing 0.1 to 5 parts by mass of CuO, preferably 0.3 to 2 parts by mass of CuO to 100 parts by mass of the fluorophosphate-based glass composed of, in mass %, 46 to 70% of $P_2O_5$, 0 to 25% of $MgF_2$, 0 to 25% of $CaF_2$, 0 to 25% of $SrF_2$, 0 to 20% of LiF, 0 to 10% of NaF, 0 to 10% of KF, where the total amount of LiF, NaF, and KF is 1 to 30%, 0.2 to 20% of $AlF_3$, and 0 to 15% of $ZnF_2$ (where up to 50% of the total amount of fluoride can be replaced with oxide). As a commercially available product, an NF-50 glass (trade name, manufactured by ASAHI GLASS CO., LTD.) and the like are cited as an example.

Concrete examples of the phosphate-based glass containing CuO include one containing 0.1 to 5 parts by mass of CuO, preferably 0.3 to 2 parts by mass of CuO to 100 parts by mass of the phosphate-based glass composed of, in mass %, 40 to 85% of $P_2O_5$, 8 to 17% of $Al_2O_3$, 0 to 10% of $B_2O_3$, 0 to 5% of $Li_2O$, 0 to 8% of $Na_2O$, 0 to 10% of $K_2O$, 0.1 to 15% of $Li_2O+Na_2O+K_2O$, and 0 to 3% of $SiO_2$.

The thickness of the glass substrate 110 is not limited in particular, but from the standpoints of reduction in size and reduction in weight, the 0.1 mm to 3 mm range is preferable, the 0.1 mm to 1 mm range is more preferable, and the 0.1 mm to 0.5 mm range is further preferable.

[Manufacturing Method of Glass Member]

Figure 2A:
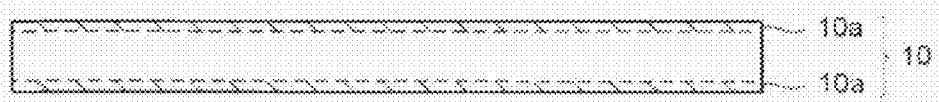
FIG. 2A is a view to explain a manufacturing method of the glass member illustrated in FIG. 1A.
Figure 2B:
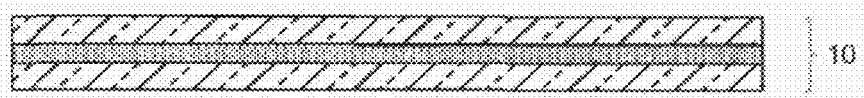
FIG. 2B is a view to explain the manufacturing method of the glass member illustrated in FIG. 1A.
Figure 2C:
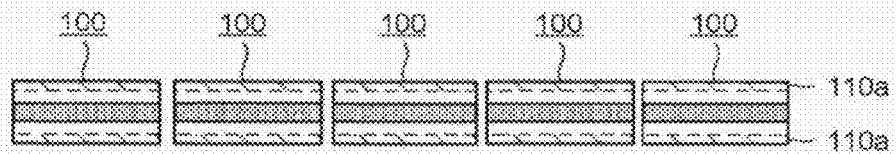
FIG. 2C is a view to explain the manufacturing method of the glass member illustrated in FIG. 1A.

Next, there will be explained the manufacturing method of the glass member in this embodiment with reference to the drawings. FIG. 2A to FIG. 2C are views to explain each step of one embodiment of the manufacturing method of the glass member in order.

First, a glass plate is prepared, strengthening is performed on at least one principal surface of this glass plate to form a compressive stress layer 10a, and a glass plate 10 whose principal surface is strengthened is obtained (FIG. 2A). At this time, the strengthening is performed by physical tempering or chemical strengthening as described above. Further, the compressive stress layer 10a is formed on the both principal surfaces in FIG. 2A, but may also be formed on either of the principal surfaces.

As the strengthening method, in the air-cooling tempering method (physical tempering method), the glass plate principal surface heated up to a temperature near a softening point only needs to be rapidly cooled by air cooling or the like, and further the chemical strengthening only needs to be performed by a publicly known method of replacing alkali metal ions existing on the glass plate principal surface with alkali ions having a larger ion radius at temperatures equal to or lower than a glass transition point. The chemical strengthening can be achieved by, for example, immersing a glass in a molten salt at 350° C. to 550° C. for about 1 to 72 hours. As long as the molten salt used for the chemical strengthening is one containing potassium ions or sodium ions, the molten salt is not limited in particular, but, for example, a molten salt of potassium nitrate ($KNO_3$) is appropriately used. Besides, a molten salt of sodium nitrate ($NaNO_3$) or a molten salt obtained by mixing potassium nitrate ($KNO_3$) and sodium nitrate ($NaNO_3$) may also be used.

By radiating laser light to this glass plate 10, a reformed region R is formed inside the glass plate 10 along a planned cutting line (FIG. 2B). Incidentally, the reformed region R may also be formed by scanning with the laser light a plurality of times along the planned cutting line. In other words, the reformed region may also be expanded by scanning with the laser light a plurality of times along the planned cutting line with the collecting point of the laser light made different in the plate thickness direction of the glass plate 10. Incidentally, for the purpose of illustrating the reformed region R formed inside the glass plate 10, FIG. 2B is illustrated as a cross-sectional view of the glass plate 10 taken along the planned cutting line.

Then, by applying a tension cutting stress to the glass plate 10, the glass plate 10 is cut into individual pieces along the reformed region R (FIG. 2C). Incidentally, FIG. 2B illustrates the reformed region R only in a form along the cross section of the glass, but in practice, the reformed region R is formed into a desired size and shape. For example, when the reformed region is formed into a lattice pattern when the glass plate 10 is viewed in a plan view like FIG. 5A to FIG. 5C to be described later, the planar shape is cut into square shapes or rectangular shapes, resulting in that a large number of glass members 100 can be manufactured at a time.

Incidentally, although simple explanations of the formation of the reformed region R to the cutting operation in FIG. 2B to FIG. 2C described above have been made above, more detailed explanations thereof will be made below with reference to FIG. 3 to FIG. 5C.

(Cutting Apparatus for Glass Plate)

Figure 3:
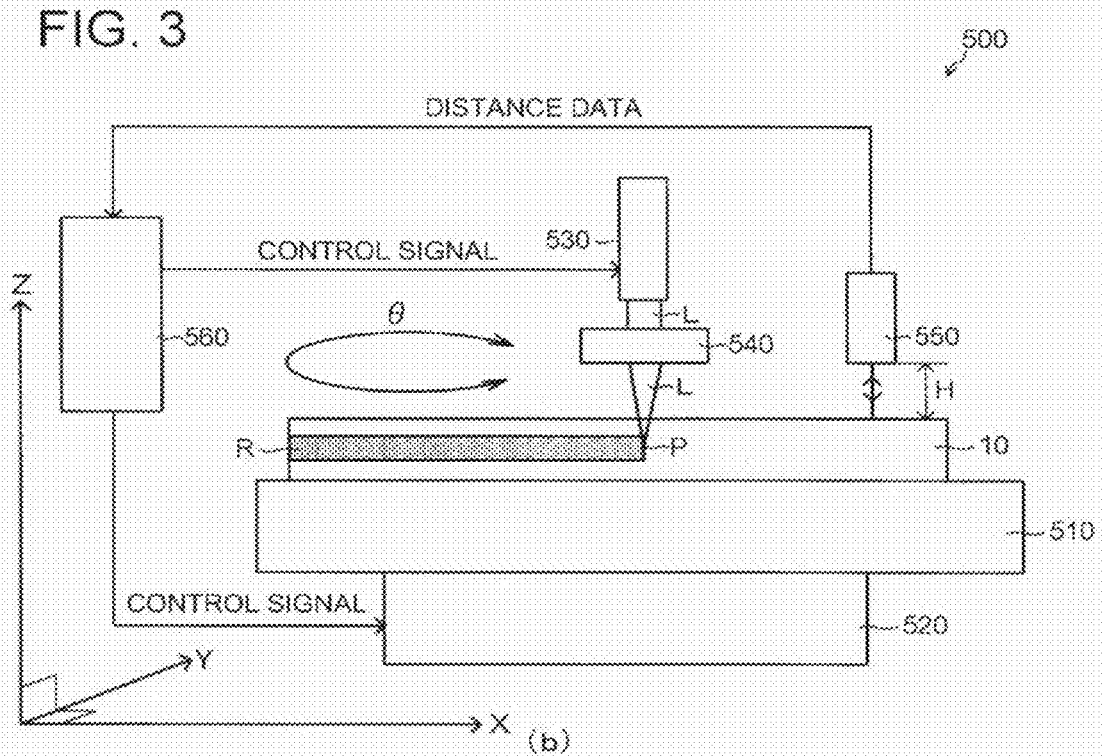
FIG. 3 is a schematic view of a cutting apparatus used for reforming and cutting of a glass plate according to the first embodiment.

FIG. 3 is a schematic view of a cutting apparatus 500 for the glass plate according to this embodiment. As illustrated in FIG. 3, the cutting apparatus 500 includes: a table 510; a driving mechanism 520; a laser light radiation mechanism 530; an optical system 540; a distance measuring system 550; and a control mechanism 560.

The table 510 is a table for allowing the glass plate 10 being a cutting object to be mounted. The glass plate 10 is mounted on the table 510. Incidentally, the table 510 is constituted so as to be movable in X, Y, and Z directions illustrated in FIG. 3. Further, the table 510 is constituted so as to be rotatable in a θ direction illustrated in FIG. 3 in an XY plane.

The driving mechanism 520 is coupled to the table 510 and moves, based on an instruction from the control mechanism 560, the table 510 in the horizontal directions (X and Y directions), the vertical direction (Z direction), and the rotation direction (θ direction). The laser light radiation mechanism 530 is a light source that radiates laser light L. Incidentally, a YAG laser is preferably used for the light source. This is because it can provide a high laser intensity and is power-saving and relatively inexpensive.

In the case of the YAG laser, the center wavelength of the laser light L to be output is 1064 nm, but nonlinear optical crystals are used to generate harmonics, and thereby laser light having a center wavelength of 532 nm (green) or laser light having a center wavelength of 355 nm (ultraviolet light) can also be obtained. In this embodiment, because of cutting the glass plate 10, a light source to output laser light having a center wavelength of 532 nm is used. This is because the laser light having a center wavelength of 532 nm is the most transmittable through the glass plate 10 and is suitable for cutting. The laser light having this wavelength is suitable also for cutting of a glass plate having a resin film formed thereon like later-described second and third embodiments.

Incidentally, one capable of radiating pulsed laser light is preferably used for the laser light radiation mechanism 530. Further, as the laser light radiation mechanism 530, one for which the wavelength, pulse width, repetition frequency, radiation time, energy intensity, and the like of the laser light L can be arbitrarily set according to the thickness (plate thickness) of the glass plate 10 and the size of the reformed region to be formed is preferably used.

The optical system 540 includes an optical lens OL, and converges the laser light from the laser light radiation mechanism 530 to the inside of the glass plate 10. In other words, the optical system 540 forms a collecting point P inside the glass plate 10 to form the reformed region R. The distance measuring system 550 is, for example, a laser distance meter and measures a distance H to the principal surface of the glass plate 10 by a triangulation method. The distance measuring system 550 measures the distance H to the principal surface of the glass plate 10 at predetermined time intervals (for example, every several milliseconds), and outputs the measured distance H to the control mechanism 560.

The control mechanism 560 controls the driving mechanism 520 to move the table 510 so that the laser light is radiated along the planned cutting line of the glass plate 10, and the laser light radiation mechanism 530 radiates the laser light to the glass plate 10. Further, the control mechanism 560 adjusts the height of the table 510 based on distance information output from the distance measuring system 550. Incidentally, the control mechanism 560 may also control the optical system 540 to adjust the radiation position of the laser light.

More specifically, the control mechanism 560 controls the driving mechanism 520 to make the distance H between the optical system 540 and the glass plate 10 fall within a fixed range (for example, ±5 μm) to thereby adjust the position of the glass plate 10 in the height direction (Z direction). Incidentally, from a viewpoint of the strength of the glass plate 10 after cutting, the height of the glass plate 10 is preferably adjusted so as to bring the collecting point of the laser light to substantially the center in the thickness direction of the glass plate 10.

Figure 4:
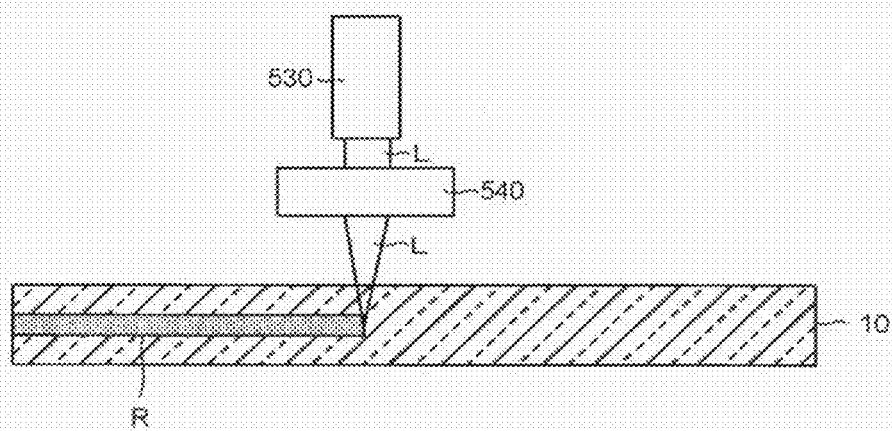
FIG. 4 is a view to explain a reforming step of the glass plate according to the first embodiment.

FIG. 4 is an explanatory view of a reforming step of the glass plate 10. As illustrated in FIG. 4, it is preferable that the reformed region R formed inside the glass plate 10 by radiation of the laser light should not reach up to the principal surface of the glass plate 10.

(Cutting Method)

Figure 5A:
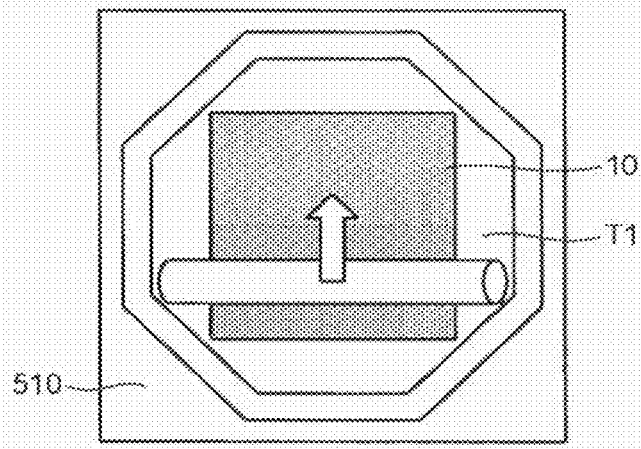
FIG. 5A is a view to explain a cutting step of the glass plate according to the first embodiment.
Figure 5B:
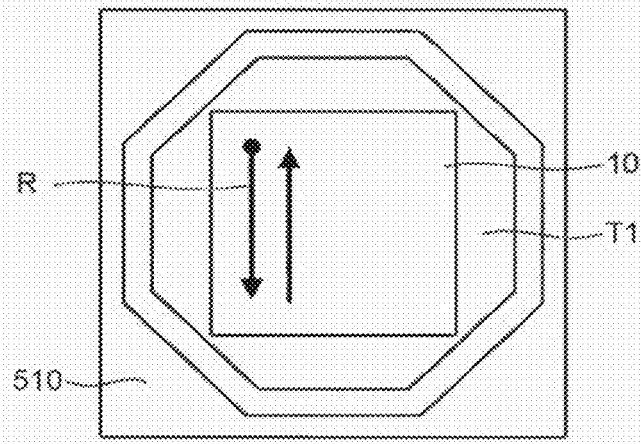
FIG. 5B is a view to explain the cutting step of the glass plate according to the first embodiment.
Figure 5C:
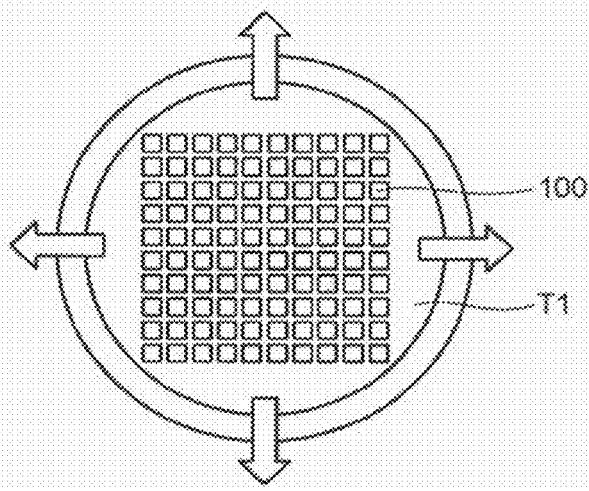
FIG. 5C is a view to explain the cutting step of the glass plate according to the first embodiment.

FIG. 5A to FIG. 5C are explanatory views of a cutting method of the glass plate 10. Hereinafter, the cutting method of the glass plate 10 will be explained with reference to FIG. 5A to FIG. 5C.

The glass plate 10 is bonded to a tape Ti for expansion, and is mounted on the stage 510 of the cutting apparatus 500 explained referring to FIG. 3 (FIG. 5A). Incidentally, the single glass plate 10 is bonded to the tape Ti in FIG. 5A, but the number of glass plates 10 to be bonded to the tape Ti may also be any number.

Next, the cutting apparatus 500 is used to radiate the laser light to the glass plate 10 along the planned cutting line, to thereby form the reformed region R (FIG. 5B). Incidentally, the reformed region R may also be formed by scanning with the laser light a plurality of times along the planned cutting line. In other words, scanning with the laser light may also be performed a plurality of times along the planned cutting line with the collecting point of the laser light made different in the plate thickness direction of the glass plate 10.

When an anti-reflection film has been formed on the principal surface of the laser light radiated side of the glass plate 10 at this time, the laser light is unlikely to be reflected on the principal surface of the glass plate 10. This makes it possible to suppress a decrease in energy efficiency of the laser light entering the inside of the glass plate 10. As a result, it is possible to decrease the occurrence possibility of a problem such that a desired reformed region R cannot be formed at a desired position.

Next, by expanding the tape Ti in outline arrow directions, a tension cutting stress is applied to the glass plate 10. Thereby, the glass plate 10 is cut into individual pieces along planned cutting lines starting from the reformed region R formed in the glass plate 10 (FIG. 5C).

As described above, according to the cutting method of the glass plate and the glass plate according to this embodiment, cracks occur starting from the reformed region R formed inside the glass plate 10, so that the glass plate 10 can be easily cut. Further, by pulling the glass plate 10 in a planar direction, the cracks formed in the reformed region R are likely to extend in the plate thickness direction of the glass plate, thus making the cut surface of the glass plate unlikely to be rough and making it possible to obtain a good dimensional accuracy.

Incidentally, in this embodiment, by strengthening, the compressive stress layer 10a is formed on the principal surfaces of the glass plate 10 and in the center portion of the tension stress region formed in the plate thickness direction inside, a tension stress (CT) is formed. Therefore, in the reformed region R formed inside the glass plate 10, stress to act in the direction to expand the cracks exists, and the cracks starting from the reformed region R are likely to extend in the plate thickness direction even when they are short (compared to the case of no strengthening). Further, this glass plate 10 is set to have the same characteristics as those of the above-explained glass substrate 110. That is, a fracture toughness ($K_{1c}$) of the glass plate 10, and the tension stress (CT) of the center portion of the tension stress region, and a crack initiation load (CIL) satisfy the following expression (1).

$$\left[ a \times K_{1c} \times \left\{ \frac{2}{\pi} \left( \frac{K_{1c}}{CT} \right)^2 \times 10^6 \right\}^{\frac{3}{2}} \right]^{\frac{2}{b+1}} > 3 \times CIL \quad (1)$$

where "a" represents a positive number of 0.4 to 7 and "b" represents an integer of 2 to 7.

Therefore, it is possible to decrease output of the laser light at the time of forming the reformed region R and decrease the width of the reformed region R itself. Further, with the above, linearity of an edge line between the cut surface and each of the principal surfaces can be made high to increase strength of the glass plate 10.

Figure 6:
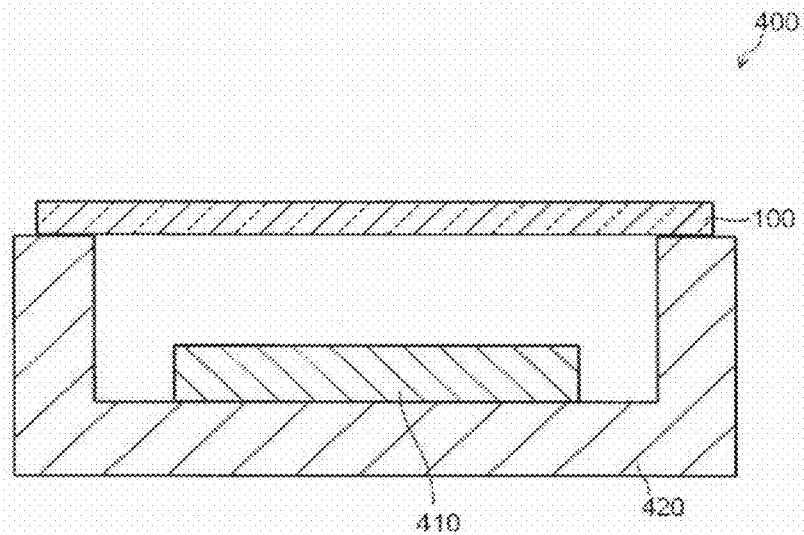
FIG. 6 is a cross-sectional view of an imaging apparatus using the glass member according to the first embodiment.

FIG. 6 is a cross-sectional view illustrating one example where the glass member 100 cut as described above is used for an imaging apparatus 400. The imaging apparatus 400 is made by bonding the above-described glass member 100 to a casing 420 that has a built-in solid state imaging device 410 (for example, a CCD or a CMOS) and hermetically sealing the inside. Using this glass member 100 makes it possible to suppress the concern that cracking occurs in the glass member starting from chipping and the like that occurred at the end portion. As a result, it is possible to provide a highly reliable imaging apparatus 400.

Second Embodiment

Glass Member

Figure 7:
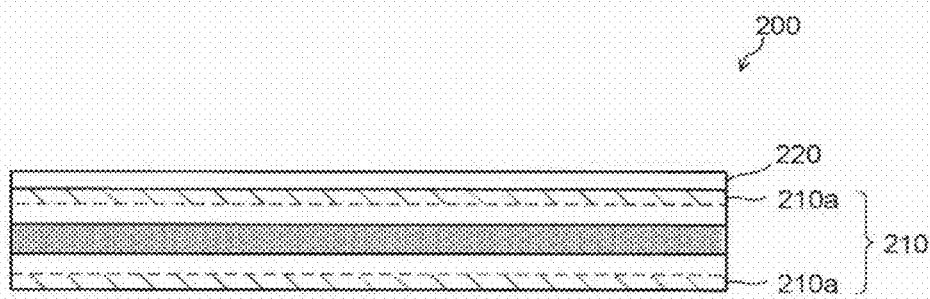
FIG. 7 is a side view of a glass member according to a second embodiment.

FIG. 7 is a side view illustrating a glass member 200 according to a second embodiment of the present invention. As illustrated in FIG. 7, the glass member 200 according to this embodiment includes a glass substrate 210 to be a base thereof and a resin layer 220 formed on either principal surface of the glass substrate 210, and the glass substrate 210 includes compressive stress layers 210a formed on the principal surfaces of the substrate by strengthening. Incidentally, the glass member 200 described here exemplifies an infrared cut filter.

This embodiment will be hereinafter explained, but the glass substrate 210 described here is the same as the glass substrate 110 explained in the first embodiment, so that the explanation of the glass substrate 210 is omitted.

<Resin Layer>

The resin layer 220 is a resin-made film provided on the principal surface of the glass substrate 210, and is a film having a predetermined optical function. Here, as the resin layer 220, an optical function film such as an infrared absorption film or an ultraviolet absorption film can be cited. In this embodiment, the case of an infrared absorption film will be explained below as an example.

When being an infrared absorption film, the resin layer 220 is composed of a transparent resin containing an infrared absorbent that absorbs light in an infrared wavelength region.

The transparent resin used for the resin layer 220 only needs to transmit light in a visible wavelength region, and for example, an acrylic resin, a styrene resin, an ABS resin, an AS resin, a polycarbonate resin, a polyolefin resin, a polyvinyl chloride resin, an acetate-based resin, a cellulose-based resin, a polyester resin, an allyl ester resin, a polyimide resin, a polyamide resin, a polyimide ether resin, a polyamide-imide resin, an epoxy resin, a urethane resin, a urea resin, and so on are cited.

Further, examples of the infrared absorbent absorbing light in the infrared wavelength region, which is contained in the resin layer 220, include inorganic fine particles of ITO ($In_2O_3$—$TiO_2$-based), ATO (ZnO—$TiO_2$-based), lanthanum boride, and so on, and organic pigments of a cyanine-based compound, a phthalocyanine-based compound, a naphthalocyanine-based compound, a dithiol metal complex-based compound, a diimonium-based compound, a polymethine-based compound, a phthalide compound, a naphthoquinone-based compound, an anthraquinone-based compound, an indophenol-based compound, and so on.

Other than the above, as the inorganic fine particles, those composed of crystallites of oxides each containing at least Cu and/or P and having a number average aggregated particle size of 5 to 200 nm, preferably, those composed of crystallites of compounds expressed by the following chemical formula (1) and having a number average aggregated particle size of 5 to 200 nm can be used.

$$A_{1/n}CuPO_4 \quad (1)$$

where A represents at least one selected from a group consisting of alkaline metals (Li, Na, K, Rb, Cs), alkaline earth metals (Mg, Ca, Sr, Ba) and $NH_4$, a subscript n is 1 when A represents an alkaline metal or $NH_4$, and 2 when A represents an alkaline earth metal.

Those composed of such crystallites are preferable since they can maintain infrared absorbing characteristics owing to the crystal structure and can be contained in high concentration in the infrared absorption film because the crystallites are fine particles to increase the absorptivity per unit length.

The inorganic fine particles may also be subjected to a principal surface treatment by a publicly known method for the purpose of improving the weather resistance, acid resistance, water resistance and so on and improving compatibility with a binder resin by principal surface modification.

Further, as the organic pigment, a pigment can be used that has a maximum absorption peak having a peak wavelength of 695±1 nm and having a full width at half maximum of 35±5 nm in an absorption spectrum of light in a wavelength region of 400 to 1000 nm measured by being dissolved in acetone. Such a pigment is preferable because it steeply changes in absorbance between wavelengths near 630 nm and 700 nm required for a near-infrared cut filter.

One kind of infrared absorbent may be used alone or two kinds or more may be used by mixture.

Further, this resin layer 220 may also contain an arbitrary component as necessary in a range not inhibiting the effect of the present invention in addition to the above-described components. Concrete examples of the arbitrary component are a color tone correcting pigment, an ultraviolet absorbent, a leveling agent, an antistatic agent, a heat stabilizer, a light stabilizer, an antioxidant, a dispersing agent, a flame retardant, a lubricant, a plasticizer, and so on. Further, components to be added to a coating liquid used for forming a later-described near-infrared absorption layer, for example, a silane coupling agent, a heat or photopolymerization initiator, a component derived from a polymerization catalyst, and so on can be cited.

The film thickness of this resin layer 220 is not limited in particular, and is appropriately determined in accordance with use, namely a disposition space in an apparatus to be used, required absorbing characteristics, and the like. The above-described film thickness is preferable to be 0.1 µm to 100 µm. When the film thickness is less than 0.1 µm, there is a risk that infrared absorptivity cannot be sufficiently exhibited. On the other hand, when the film thickness is greater than 100 µm, there is sometimes a case that cutting becomes difficult. Further, the film thickness is more preferable to be 0.5 µm to 50 µm. As long as the film thickness is in this range, sufficient infrared absorptivity and film thickness evenness can be both achieved.

Further, the resin layer 220 generally has viscous characteristics rather than a brittle material, and for example, toughness thereof (Izod impact value: JIS K7110) is preferably in a range of 10 J/m to 1000 J/m. Further, the Young's modulus of the resin layer 220 is preferable to be 10 GPa or less. When the resin layer is provided on the surface of the glass member, there is sometimes a case that cutting becomes difficult due to the above-described physical properties of the resin. However, in the glass member in this embodiment, compared to an unstrengthened glass, formation by cutting of the glass substrate can be well performed, and furthermore the glass substrate containing the resin layer 220 can be cut well even when the viscous resin layer 220 is formed as described above. Therefore, there can be obtained a glass member that has a smooth cut surface, has no burrs or the like of the resin, and is well applicable to a casing.

Incidentally, in FIG. 7, the resin layer 220 is formed on only either surface, but may also be formed on both surfaces. On this occasion, it is preferably designed so that the function of the resin layer 220 is made different for each layer to be formed to obtain a predetermined function as the entire glass member.

Further, in FIG. 7, the resin layer 220 is directly formed on the principal surface of the glass substrate 210, but a different optical function layer may also be provided between the glass substrate 210 and the resin layer 220, on the resin layer 220, or on the glass substrate 210. At this time, as the optical function layer, there can be cited, for example, anti-reflection films composed of a single layer film of $MgF_2$, a multilayer film made by stacking a mixture film of $Al_2O_3$—$TiO_2$ and $ZrO_2$ and $MgF_2$, an alternate multilayer film of $SiO_2$—$TiO_2$, and the like, and publicly known optical function films such as a UVIR cut film that is composed of a multilayer film made by stacking dielectric films different in refractive index such as $SiO_2.TiO_2$ and cuts ultraviolet light (UV) and infrared light (IR).

[Manufacturing Method of Glass Member]

Next, there will be explained a manufacturing method of the glass member in this embodiment. In this embodiment, the manufacture is performed by the same method as the manufacturing method of the glass member in the first embodiment basically, but the resin layer 220 is provided in this embodiment, so that its step is added. That is, after strengthening is performed on the principal surfaces of the glass plate to obtain the glass plate 10 and before forming the reformed region R, the step of forming the resin layer on the principal surface of the glass plate 10 only needs to be added, and after the resin layer is formed, it is only necessary to form the reformed region and perform the cutting operation in the same manner as in the first embodiment. Hereinafter only the step of forming the resin layer will be explained.

On the principal surface of the compressive stress layer 10a of the strengthened glass plate 10 illustrated in FIG. 2A, a resin layer is provided and a resin layer-attached glass plate is obtained. This resin layer has the same composition as that of the resin layer explained above. Formation of the resin layer on the principal surface of the glass plate 10 only needs to follow an ordinary method, and the resin layer can be manufactured as a result that for example, a coating liquid prepared by dispersing or dissolving an infrared absorbing pigment and a raw material component of a transparent resin in a solvent is applied on the glass plate 10 to be dried and is further cured as necessary. The resin layer having infrared absorptivity is formed by such a method, to thereby enable uniform manufacture with a desired film thickness. When the above-described arbitrary component is contained, the arbitrary component only needs to be contained in the coating liquid.

Concrete example of the above-described solvent include: ketones such as acetone and cyclohexanone; ethers such as tetrahydrofuran, 1,4-dioxane, and 1,2-dimethoxyethane; esters such as ethyl acetate, butyl acetate, and methoxyethyl acetate; alcohols such as methanol, ethanol, 1-propanol, 2-propanol, 1-butanol, 2-butanol, 2-methyl-1-propanol, 2-methoxyethanol, 4-methyl-2-pentanol, 2-butoxyethanol, 1-methoxy-2-propanol, and diacetone alcohol; hydrocarbons such as n-hexane, n-heptane, isooctane, benzene, toluene, xylene, gasoline, light oil, and kerosene; acetonitrile; nitromethane; water; and so on. Two kinds or more of these may also be used in combination.

The resin layer can be formed as a result that for example, a coating liquid is prepared by dispersing or dissolving a transparent resin, an infrared absorbent and another additive to be mixed as necessary in a dispersion medium or a solvent and is applied, and then is dried. The application and drying can be performed in a divided manner in a plurality of times. Further, it is also possible on this occasion that a plurality of coating liquids having different components are prepared and these are applied sequentially to be dried. Concretely, it is also possible that for example, the above-described coating liquid containing the organic pigment and a coating liquid containing ITO particles are prepared separately and these are applied sequentially to be dried.

Examples of the dispersion medium or the solvent include water, alcohol, ketone, ether, ester, aldehyde, amine, aliphatic hydrocarbon, alicyclic hydrocarbon, aromatic hydrocarbon, and so on. One kind of these may be used alone, or two kinds or more of these may also be used by mixture. A dispersing agent can be mixed into the coating liquid as necessary.

For the preparation of the coating liquid, a stirring apparatus such as a planetary centrifugal mixer, a bead mill, a planetary mill, or an ultrasonic homogenizer can be used. It is preferable to perform stirring sufficiently for the purpose of securing high transparency. Stirring may be performed continuously or may also be performed intermittently.

Further, for the application of the coating liquid, a spin coating method, a bar coating method, a dip coating method, a casting method, a spray coating method, a bead coating method, a wire bar coating method, a blade coating method, a roller coating method, a curtain coating method, a slit die coating method, a gravure coating method, a slit reverse coating method, a microgravure method, a comma coating method, or the like can be used. Besides, a bar coater method, a screen printing method, a flexographic printing method, or the like can also be used.

As a result of drying following the application of the above-described coating liquid on the glass plate 10, the resin layer is formed on the glass plate 10. When the coating liquid contains the raw material component of the transparent resin, curing is further performed. When reaction is thermal-curing, the drying and the curing can be performed at the same time, but when it is photo-curing, the curing is provided separately from the drying.

Incidentally, the resin layer can also be manufactured in a film form by extrusion molding, depending on the kind of the transparent resin, and it is also possible to stack a plurality of thus manufactured films to integrate them by thermocompression bonding or the like. Further, it is also possible to manufacture it by peeling the resin layer formed on a peelable substrate. By pasting the resin layer obtained as a simple substance in this manner on the glass plate 10 by using, for example, an adhesive or the like by an ordinary method, the resin layer-attached glass plate having the resin layer can be obtained.

Incidentally, in the above-described explanation, the resin layer 220 having the optical function, mainly the infrared absorbing function, has been explained, but may also be a resin layer for adding, in addition to it, a protective function, an anti-reflection function, a dustproof function, an antistatic function, and so on thereto. The film to which the above-described respective functions are given can be used without being limited in particular as long as it does not disturb the optical characteristics of the glass member.

Third Embodiment

Figure 8A:
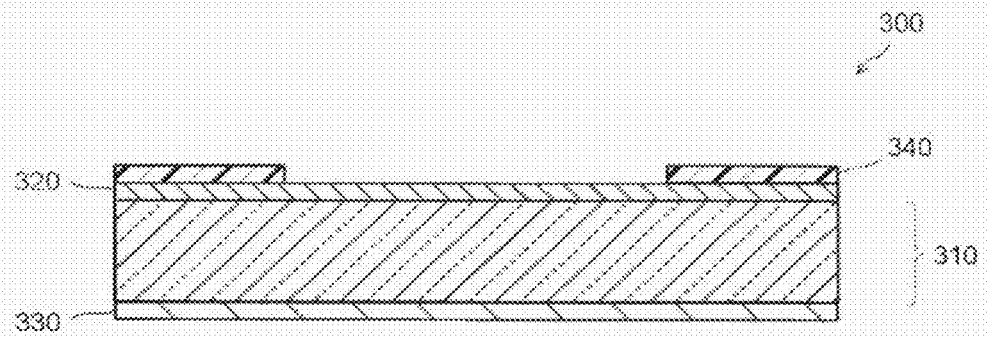
FIG. 8A is a cross-sectional view of a glass member according to a third embodiment.
Figure 8B:
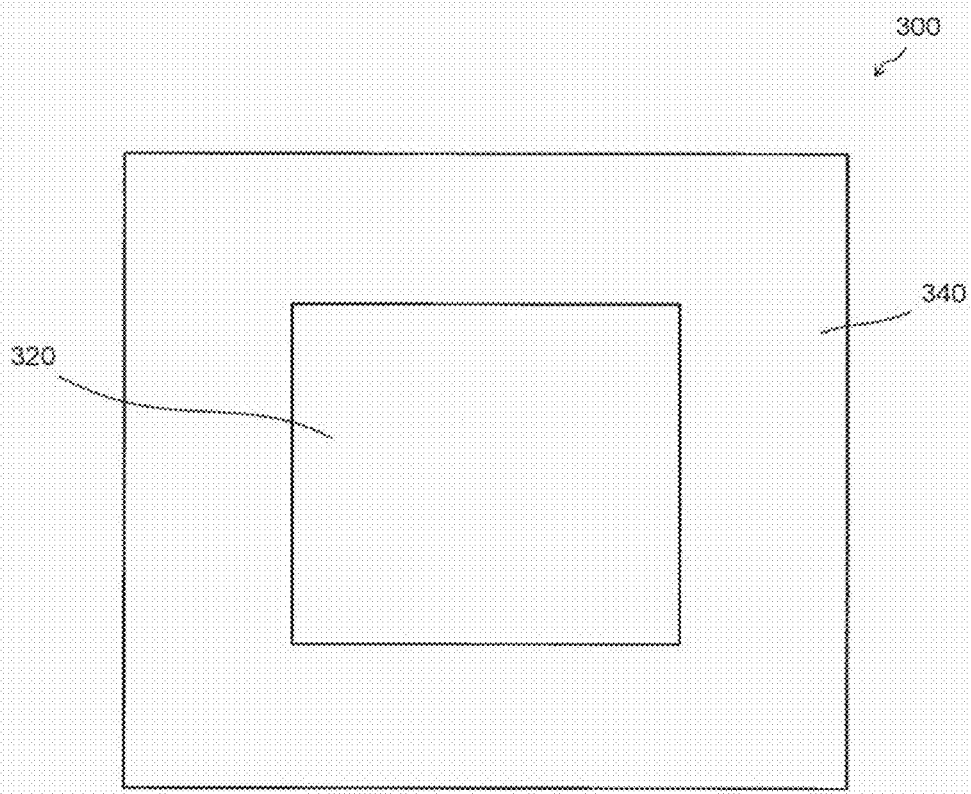
FIG. 8B is a plan view of the glass member according to the third embodiment.

Next, there will be explained a third embodiment of the present invention. This embodiment is, as illustrated in FIG. 8A and FIG. 8B, a glass member 300 made by including a glass substrate 310 whose principal surfaces are strengthened, an ultraviolet and infrared light reflective film 320 composed of a dielectric multilayered film that is formed on one principal surface of the glass substrate 310 and transmits light in a visible wavelength region but reflects lights in an ultraviolet wavelength region and an infrared wavelength region, an anti-reflection film 330 formed on the other principal surface of the glass substrate 310, and a resin layer 340 formed on at least one principal surface side of the glass substrate 310. A near-infrared cut filter is schematically illustrated also in this embodiment similarly to the second embodiment, and FIG. 8A is a cross-sectional view schematically illustrating a near-infrared cut filter in this embodiment, and FIG. 8B is its plan view.

To the glass substrate 310, the same one as the glass substrate 210 explained in the second embodiment can be applied. That is, it is a glass substrate whose principal surfaces are strengthened. Further, to the ultraviolet and infrared light reflective film 320 and the anti-reflection film 330, publicly known films can be applied.

That is, the ultraviolet and infrared light reflective film 320 is composed of a dielectric multilayered film made by alternately stacking a low refractive index dielectric layer and a high refractive index dielectric layer by a sputtering method, a vacuum deposition method, or the like. As the material composing the low refractive index dielectric layer, a material having a refractive index of 1.6 or less, preferably 1.2 to 1.6 is used. Concretely, silica ($SiO_2$), aluminum, lanthanum fluoride, magnesium fluoride, sodium aluminum hexafluoride or the like is used. Further, as the material composing the high refractive index dielectric layer, a material having a refractive index of 1.7 or more, preferably 1.7 to 2.5 is used. Concretely, titania ($TiO_2$), zirconia, tantalum pentoxide, niobium pentoxide, lanthanum oxide, yttria, zinc oxide, zinc sulfide or the like is used. Incidentally, the refractive index is a refractive index with respect to light with a wavelength of 550 nm.

The dielectric multilayered film can be formed also by an ion beam method, an ion plating method, a CVD method or the like other than the sputtering method or the vacuum deposition method. The sputtering method and the ion plating method perform a so-called plasma atmospheric treatment and therefore can improve adhesiveness to the glass substrate 310

The anti-reflection film 330 has a function of preventing reflection of light incident on the glass member 300 being a near-infrared cut filter to thereby improve the transmittance so as to efficiently utilize the incident light, and can be formed by conventionally known material and method. Concretely, the anti-reflection film 330 is composed of a film of one or more layers of silica, titania, tantalum pentoxide, magnesium fluoride, zirconia, alumina or the like formed by a sputtering method, a vacuum deposition method, an ion beam method, an ion plating method, a CVD method or the like, or silicate series, silicone series, methacrylate fluoride series or the like formed by a sol-gel method, a coating method or the like. The thickness of the anti-reflection film 330 is normally in a range of 100 to 600 nm.

Then, in the third embodiment, as the resin layer 340, a resin-made frame-shaped light blocking film (hereinafter, also simply referred to as a "light blocking film") is formed on at least one principal surface side of the glass substrate 310.

This light blocking film is formed on the principal surface of the ultraviolet and infrared light reflective film 320 side of the glass substrate 310 by a light-blocking resin containing an inorganic or organic coloring agent such as carbon black or titanium black to be a visible light absorbent. The kind of the resin is not particularly limited but any of a light curing resin, a thermoplastic resin, and a thermosetting resin is usable, each of which is cured by being irradiated with light in an ultraviolet wavelength region or the like. Incidentally, a "light blocking property" here means a property of blocking transmission of light by mainly absorbing light. The light blocking film made of such a resin having a light blocking property functions as a so-called diaphragm that adjusts the amount of light incident on an imaging device or cutting stray light when the glass member 300 being a near-infrared cut filter in this embodiment is used in a later-described imaging apparatus having a built-in imaging device.

This light blocking film (resin layer 340) can be formed by the following method, for example.

First, a light curing resin having a light blocking property is applied to the entire principal surface of the ultraviolet and infrared light reflective film 320 of the glass substrate 310, and dried to form into a light curing resin coated layer. As a coating method of the light curing resin, a spin coating method, a bar coating method, a dip coating method, a casting method, a spray coating method, a bead coating method, a wire bar coating method, a blade coating method, a roller coating method, a curtain coating method, a slit die coating method, a gravure coating method, a slit reverse coating method, a microgravure method, a comma coating method, or the like can be used. The application may also be performed in a divided manner in a plurality of times. Further, prior to the application, a coupling treatment using hexamethyldisilazane (HMDS) or the like may also be performed on the principal surface of the ultraviolet and infrared light reflective film 320 in order to enhance the adhesiveness to the ultraviolet and infrared light reflective film 320.

Then, light is radiated to the light curing resin coated layer via a photomask provided with a shape opening a position corresponding to the light blocking film. As for the radiated light, for example, when the light curing resin is cured with light in the ultraviolet wavelength region, light containing at least such light in the ultraviolet wavelength region is radiated. This cures the light curing resin at a portion irradiated with the light.

Then, the light curing resin at an un-irradiated portion is selectively removed by development. For the development, wet development, dry development or the like is used. The wet development can be performed using a developing solution corresponding to the kind of the light curing resin, such as an alkaline solution, an aqueous developing solution, an organic solvent or the like by a publicly known method such as a dip method, a spray method, brushing, slapping or the like. Thereby, the light blocking film is formed. The light blocking film 340 may also be further cured by heating or being irradiated with light as necessary.

The light blocking film 340 can be formed also by a printing method, a transfer method, an ink-jet method, or the like. Examples of the printing method include screen printing, flexographic printing, relief printing methods and so on. These methods have advantages that a light blocking film in a desired shape can be formed even without performing exposure using a photomask and development.

The thickness of the light blocking film is preferable to be 0.1 to 400 μm. When the thickness is less than 0.1 μm, it may cause a possibility to fail to obtain sufficient light blocking characteristics. On the other hand, when the thickness exceeds 400 μm, the thickness of the whole filter increases to make reduction in size and weight of the imaging apparatus difficult. Further, distortion becomes more likely to occur due to curing shrinkage when the resin is cured, therefore the thickness of the light blocking film is more preferable to be 0.2 to 100 μm, and further preferable to be 0.5 to 10 μm, to suppress occurrence of the distortion.

Incidentally, in this embodiment, on the principal surface, of the glass substrate 310, on the side opposite to the principal surface on which the ultraviolet and infrared light reflective film 320 is formed, in place of the anti-reflection film 330, or between the anti-reflection film 330 and the glass substrate 310, a second ultraviolet and infrared light reflective film composed of a dielectric multilayer film to reflect lights in the ultraviolet wavelength region and the infrared wavelength region may also be provided. Further, in place of the ultraviolet and infrared light reflective film 320, or on the ultraviolet and infrared light reflective film 320, a second anti-reflection film may also be provided. Further, in place of the ultraviolet and infrared light reflective film 320, an anti-reflection film may also be provided, and in place of the anti-reflection film 330, a resin layer containing a pigment to absorb light in the infrared wavelength region may also be provided.

Further, the embodiment explained above is an example that the optical filter is a filter having the near-infrared cut function, but may be a filter having, not limited to the near-infrared cut function, but a function of a low-pass filter, an ND filter, a color tone filter, an optical amplifying filter or the like.

The present invention is not limited by the described contents of the above-described embodiments, but may be variously modified without departing from the scope of the present invention. Further, the glass member of the present invention is suitable for a glass member used for the above-described optical filter, for example, but is not limited to this, and may also be a glass member such as a glass for display or a glass member containing a coloring component.

EXAMPLES

Hereinafter, the present invention will be explained in detail based on Examples and Comparative Examples, but the present invention is not limited only to these Examples.

Example 1

As the glass plate, a plate-shaped aluminosilicate glass (manufactured by ASAHI GLASS CO., LTD., plate thickness 0.320 mm, dimensions 100 mm×100 mm) was prepared. This glass plate has a thermal expansion coefficient of $72 \times 10^{-7}$/K and has a fracture toughness of 0.75 MPa·m$^{1/2}$. Chemical strengthening was performed in a manner that this glass plate was immersed in a molten salt of 100%-concentration potassium nitrate ($KNO_3$) at a temperature of 400° C. to replace sodium ions on the surfaces of the glass plate with potassium ions by ion exchange. By this chemical strengthening, a tension stress (CT) of 61 MPa was formed in a center portion of a tension stress region formed in the plate thickness direction inside of the glass plate (at a position of 0.160 mm in the plate thickness direction from the glass surface). Incidentally, a surface compressive stress (CS) of the glass plate was 770 MPa and a depth of a surface compressive layer (DOL) of the glass plate was 22 μm.

The glass plate obtained after the chemical strengthening was cut into square shapes of 5 mm×5 mm under cutting conditions described below, to manufacture glass members each having a cut surface with a reformed region formed near the center in the plate thickness direction of the side surface.

The following conditions were used in the step of selectively forming the reformed region inside the glass plate. A YAG laser (with a center wavelength of 1064 nm) was used as a laser light source and modulated to make laser light with a center wavelength of 532 nm incident on the glass plate. Further, for the laser output, an output appropriate enough not to make the reformed region reach the principal surface of the glass plate was selected. The collecting point of the laser light was adjusted so as to be positioned near the center in the plate thickness direction of the glass plate. Incidentally, the number of times of scanning with the laser light to the glass plate is one time.

Next, the glass plate having had the reformed region formed therein was bonded to an expansible resin film and the resin film was pulled in the planar direction of the glass plate, to thereby extend cracks formed in the reformed region up to the principal surface of the glass plate starting from the reformed region of the glass plate, and thereby fracture occurred in the thickness direction of the glass plate and the glass plate was cut along the reformed region to fabricate the glass member.

In the glass plate, CIL, $K_{1c}$, the plate thickness, the strengthening conditions (potassium nitrate concentration, treatment temperature, and treatment time), and the strengthening characteristics (surface compressive stress (CS), surface compressive layer depth (DOL), and tension stress (CT)) were presented in Table 1, and the index value A regarding the expression (1), the index value B regarding the right term of the expression (2), the index value A–B regarding the expression (2), the index value C regarding the expression (4), the laser output, good or poor of cutting, 4-point bending strength after cutting, and presence or absence of oblique pattern were presented in Table 2.

Examples 2 to 5

Figure 9:
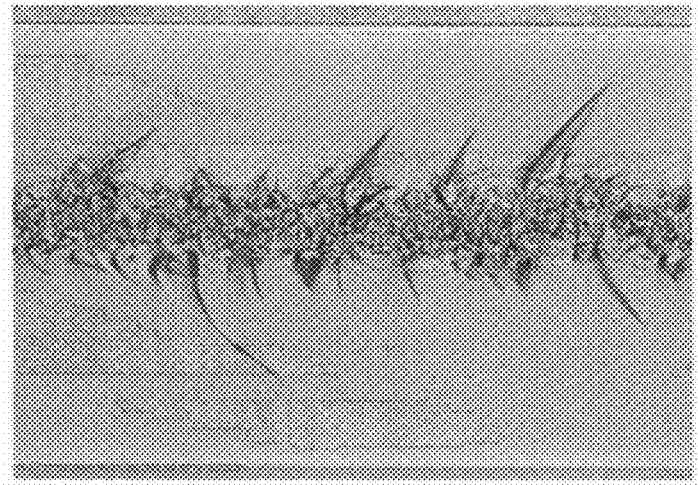
FIG. 9 is a photograph of a side surface (cut surface) of a glass member obtained in Example 2.
Figure 10:
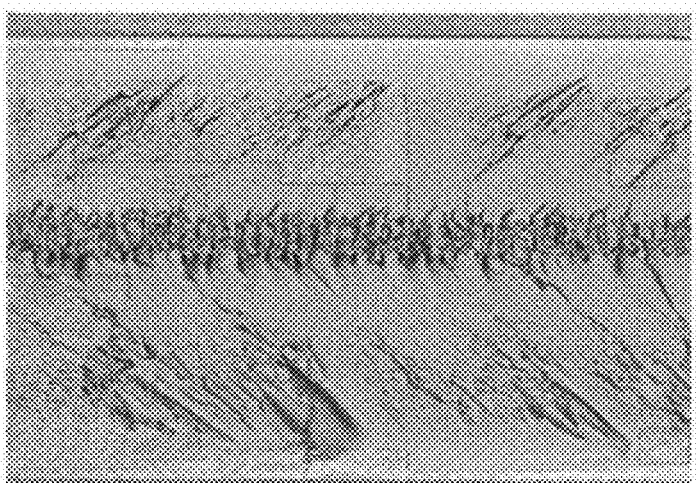
FIG. 10 is a photograph of a side surface (cut surface) of a glass member obtained in Example 5.

Manufacture and cutting of a glass plate were performed by the same operations as those in Example 1 except that chemical strengthening was performed on the same glass plate as that in Example 1 by changing the time of immersion into a molten salt of 100%-concentration potassium nitrate ($KNO_3$) at a temperature of 400° C. as described in Table 1 to replace sodium ions on the surfaces of the glass plate with potassium ions by ion exchange. By this chemical strengthening, a tension stress (CT) was formed in the center portion in the plate thickness direction of the glass plate. Under the cutting conditions described in Table 2, the glass plate was cut by the same operation as that in Example 1 to fabricate glass members. Of the glass plate, the characteristics, the plate thickness, the strengthening conditions, the strengthening characteristics, the respective index values, the reforming process condition, good or poor of cutting, 4-point bending strength, and presence or absence of oblique pattern were presented in Table 1 and Table 2 in a summary form. Further, photographs of side surfaces (cut surfaces) of the glass members obtained in Example 2 and Example 5 were presented in FIG. 9 and FIG. 10 respectively.

Examples 6 to 14

Manufacture and cutting of a glass plate were performed by the same operations as those in Example 1 except that chemical strengthening was performed on the same glass plate as that in Example 1 by changing the kind of a mixed molten salt of 96 mass % in concentration of potassium nitrate ($KNO_3$) or 85 mass % in concentration of potassium nitrate ($KNO_3$) and sodium nitrate ($NaNO_3$) and the time of immersion into the molten salt as described in Table 1 to replace sodium ions on the surfaces of the glass plate with potassium ions by ion exchange. By this chemical strengthening, a tension stress (CT) was formed in the center portion in the plate thickness direction of the glass plate. Under the cutting conditions described in Table 2, the glass plate was cut by the same operation as that in Example 1 to fabricate glass members. Of the glass plate, the characteristics, the plate thickness, the strengthening conditions, the strengthening characteristics, the respective index values, the reforming process condition, good or poor of cutting, 4-point bending strength, and presence or absence of oblique pattern were presented in Table 1 and Table 2 in a summary form.

Examples 15 to 25

Glass members were fabricated by the same operations as those in Example 1 except that the thickness of a glass plate to be used and the conditions of the chemical strengthening were set as described in Table 1. Of the glass plate, the characteristics, the plate thickness, the strengthening conditions, the strengthening characteristics, the respective index values, the reforming process condition, good or poor of cutting, 4-point bending strength, and presence or absence of oblique pattern were presented in Table 1 and Table 2 in a summary form.

Examples 26 to 28

As the glass plate, a plate-shaped borosilicate glass (manufactured by SCHOTT, trade name: D263, plate thickness 0.15 mm, dimensions 100 mm×100 mm) was prepared. This glass plate has a thermal expansion coefficient of $72 \times 10^{-7}$/K, a fracture toughness ($K_{1c}$) of 0.67 MPa·$m^{1/2}$, and a crack initiation load (CIL) of 2.1 kgf. Glass members were fabricated by the same operations as those in Example 1 except that the conditions of the chemical strengthening were set as described in Table 1. Of the glass plate, the characteristics, the plate thickness, the strengthening conditions, the strengthening characteristics, the respective index values, the reforming process condition, good or poor of cutting, 4-point bending strength, and presence or absence of oblique pattern were presented in Table 1 and Table 2 in a summary form.

TABLE 1

| | CIL (kgf) | K1c (MPa·√m) | Plate Thickness (μm) | Strengthening Conditions | | | Strengthening Characteristics | | |
| --- | --- | --- | --- | --- | --- | --- | --- | --- | --- |
| | | | | Concentration (%) | Temperature (° C.) | Time (hr) | CS (MPa) | DOL (μm) | CT (MPa) |
| Example 1 | 0.7 | 0.75 | 320 | 100% | 400 | 2 | 770 | 22 | 61 |
| Example 2 | 0.7 | 0.75 | 320 | 100% | 400 | 4 | 770 | 31 | 93 |
| Example 3 | 0.7 | 0.75 | 320 | 100% | 400 | 5 | 760 | 37 | 114 |
| Example 4 | 0.7 | 0.75 | 320 | 100% | 400 | 6 | 750 | 40 | 125 |
| Example 5 | 0.7 | 0.75 | 320 | 100% | 400 | 8 | 730 | 46 | 147 |
| Example 6 | 0.7 | 0.75 | 320 | 96% | 400 | 4 | 520 | 32 | 65 |
| Example 7 | 0.7 | 0.75 | 320 | 96% | 400 | 8 | 500 | 45 | 98 |
| Example 8 | 0.7 | 0.75 | 320 | 96% | 400 | 12 | 490 | 53 | 121 |
| Example 9 | 0.7 | 0.75 | 320 | 96% | 400 | 17 | 480 | 62 | 152 |
| Example 10 | 0.7 | 0.75 | 320 | 85% | 400 | 12 | 300 | 48 | 64 |
| Example 11 | 0.7 | 0.75 | 320 | 85% | 400 | 24 | 280 | 67 | 101 |
| Example 12 | 0.7 | 0.75 | 320 | 85% | 400 | 30 | 270 | 76 | 122 |
| Example 13 | 0.7 | 0.75 | 320 | 85% | 400 | 48 | 260 | 90 | 167 |
| Example 14 | 0.7 | 0.75 | 320 | 85% | 400 | 91 | 230 | 113 | 276 |
| Example 15 | 0.7 | 0.75 | 180 | 100% | 400 | 2 | 770 | 23 | 132 |

TABLE 1-continued

| | | | Plate | Strengthening Conditions | | | Strengthening Characteristics | | |
|---|---|---|---|---|---|---|---|---|---|
| | CIL (kgf) | K1c (MPa·√m) | Thickness (μm) | Concentration (%) | Temperature (° C.) | Time (hr) | CS (MPa) | DOL (μm) | CT (MPa) |
| Example 16 | 0.7 | 0.75 | 180 | 100% | 400 | 3 | 770 | 29 | 183 |
| Example 17 | 0.7 | 0.75 | 180 | 100% | 400 | 4 | 770 | 34 | 234 |
| Example 18 | 0.7 | 0.75 | 180 | 96% | 400 | 2 | 520 | 19 | 70 |
| Example 19 | 0.7 | 0.75 | 180 | 96% | 400 | 3 | 520 | 28 | 117 |
| Example 20 | 0.7 | 0.75 | 180 | 96% | 400 | 4 | 510 | 32 | 141 |
| Example 21 | 0.7 | 0.75 | 180 | 96% | 400 | 8 | 500 | 44 | 239 |
| Example 22 | 0.7 | 0.75 | 200 | 96% | 400 | 12 | 480 | 52 | 260 |
| Example 23 | 0.7 | 0.75 | 200 | 96% | 400 | 16 | 470 | 60 | 353 |
| Example 24 | 0.7 | 0.75 | 180 | 85% | 400 | 14 | 290 | 54 | 218 |
| Example 25 | 0.7 | 0.75 | 180 | 85% | 400 | 23 | 280 | 65 | 364 |
| Example 26 | 2.1 | 0.67 | 150 | 85% | 375 | 24 | 290 | 23 | 64 |
| Example 27 | 2.1 | 0.67 | 150 | 85% | 375 | 36 | 293 | 31 | 103 |
| Example 28 | 2.1 | 0.67 | 150 | 85% | 375 | 72 | 255 | 45 | 191 |

TABLE 2

| | Index value A (μJ/P) | Index value B (μJ/P) | Index value A − B (μJ/P) | Index value C (N/m) | Laser output (mJ/p) | Good or poor of cutting | 4-point bending strength (MPa) | Presence or absence of oblique pattern |
|---|---|---|---|---|---|---|---|---|
| Example 1 | 16.3 | 10.8 | 5.6 | 16.9 | 12.0 | good | 455 | none |
| Example 2 | 10.0 | 6.6 | 3.4 | 23.9 | 9.0 | good | 469 | none |
| Example 3 | 7.7 | 5.1 | 2.6 | 28.1 | 6.0 | good | 538 | presence |
| Example 4 | 7.0 | 4.6 | 2.4 | 30.0 | 5.0 | good | 434 | presence |
| Example 5 | 5.7 | 3.8 | 1.9 | 33.6 | 4.0 | good | 282 | presence |
| Example 6 | 15.2 | 10.1 | 5.2 | 16.6 | 11.0 | good | 449 | none |
| Example 7 | 9.3 | 6.2 | 3.2 | 22.5 | 7.0 | good | 537 | none |
| Example 8 | 7.2 | 4.8 | 2.5 | 26.0 | 5.0 | good | 600 | presence |
| Example 9 | 5.5 | 3.6 | 1.9 | 29.8 | 4.0 | good | 482 | presence |
| Example 10 | 15.4 | 10.2 | 5.3 | 14.4 | 13.0 | good | 394 | none |
| Example 11 | 9.0 | 5.9 | 3.1 | 18.8 | 8.0 | good | 534 | none |
| Example 12 | 7.2 | 4.7 | 2.4 | 20.5 | 5.0 | good | 577 | none |
| Example 13 | 4.9 | 3.2 | 1.7 | 23.4 | 3.5 | good | 625 | none |
| Example 14 | 2.7 | 1.8 | 0.9 | 26.0 | 2.5 | good | 625 | presence |
| Example 15 | 6.5 | 4.3 | 2.2 | 17.7 | 5.0 | good | 593 | none |
| Example 16 | 4.4 | 2.9 | 1.5 | 22.3 | 3.5 | good | 620 | none |
| Example 17 | 3.3 | 2.2 | 1.1 | 26.2 | 2.5 | good | 506 | presence |
| Example 18 | 14.0 | 9.3 | 4.8 | 9.9 | 10.0 | good | 355 | none |
| Example 19 | 7.5 | 4.9 | 2.6 | 14.6 | 5.0 | good | 483 | none |
| Example 20 | 6.0 | 4.0 | 2.1 | 16.3 | 4.0 | good | 611 | none |
| Example 21 | 3.2 | 2.1 | 1.1 | 22.0 | 3.0 | good | 743 | none |
| Example 22 | 2.9 | 1.9 | 1.0 | 25.0 | 2.5 | good | 736 | none |
| Example 23 | 2.0 | 1.3 | 0.7 | 28.2 | 2.5 | presence of self-destruction | no data | observation impossible |
| Example 24 | 3.6 | 2.4 | 1.2 | 15.7 | 3.5 | good | 619 | none |
| Example 25 | 1.9 | 1.3 | 0.7 | 18.2 | 2.5 | presence of self-destruction | no data | observation impossible |
| Example 26 | 13.8 | 9.1 | 4.7 | 6.7 | 12.0 | good | 186 | none |
| Example 27 | 7.8 | 5.1 | 2.7 | 9.1 | 7.0 | good | 221 | none |
| Example 28 | 3.7 | 2.5 | 1.3 | 11.5 | 7.0 | presence of self-destruction | no data | observation impossible |

Incidentally, in the strengthening characteristics in Table 2, the index value A indicates the value of the left side of the expression (1) explained in the description (the same as the first term in the left side of the expression (2)), the index value B indicates the value of the second term of the left side of the expression (2) explained in the description, and the index value A–B indicates the value of the left side of the expression (2) explained in the description respectively.

These results reveal that the index value A exceeds (3×CIL) μJ/pulse to satisfy the expression (1) in Examples 1 to 22, 24, 26, and 27. Therefore, it was possible to confirm in all the Examples that the cutting operation can be well performed without deviating from the planned cutting line. Furthermore, in Examples 1 to 13, 15 to 21, 24, and 26 to 27, the index value A–B exceeds 1.0 μJ/pulse to satisfy the expression (2). Therefore, these are more preferable examples because the application range of the reforming condition is wide and cutting can be performed well and easily.

Further, as Comparative example, the same evaluations as those of Examples were performed on unstrengthened glass members. Results are presented in Table 3.

TABLE 3

|  | CIL (kgf) | K1c (MPa·√m) | Plate Thickness (µm) | Laser output (mJ/p) | Number of times of scanning with laser light | Good or poor of cutting | 4-point bending strength (MPa) | Presence or absence of oblique pattern |
|---|---|---|---|---|---|---|---|---|
| Example 29 | 0.7 | 0.75 | 320 | 20.0 | 2 times | good | 246 | none |
| Example 30 | 0.7 | 0.75 | 200 | 20.0 | 1 time | good | 267 | none |
| Example 31 | 2.1 | 0.67 | 150 | 15.0 | 1 time | good | 166 | none |

In Example 29, the 4-point bending strength was drastically low compared to Examples with the same plate thickness. Further, scanning with laser light to the planned cutting line needed to be performed two times in order to perform cutting. In Example 30, the 4-point bending strength was drastically low compared to Examples with the same plate thickness. In Example 31, the 4-point bending strength was low compared to Examples with the same plate thickness. Therefore, it is found out that the glass member of the present invention can obtain a higher mechanical strength than the unstrengthened glass member.

Next, a expression (c) in Examples was confirmed. The value of m (other than the coefficient k in the right side of the expression (3)) calculated in the expression (c) given below in Examples was calculated.

$$m = \left\{ a \times K_{1c} \times \left(\frac{t}{2}\right)^{\frac{3}{2}} \right\}^{\frac{2}{b+1}} \quad (c)$$

m of the same glass plate (without strengthening) as that of Example 1 to Example 14 is 22.3 µJ/pulse, m of the same glass plate (without strengthening) as that of Example 15 to Example 21 is 15.8 µJ/pulse, m of the same glass plate (without strengthening) as that of Example 22 to Example 23 is 16.8 µJ/pulse, m of the same glass plate (without strengthening) as that of Example 24 to Example 25 is 15.8 µJ/pulse, and m of the same glass plate (without strengthening) as that of Example 26 to Example 28 is 14.5 µJ/pulse. Since the left side of the expression (3) is the same as the above-described index value B, the coefficient k is less than 1 in all the glass plates of Examples. Further, it is found out in each of Examples that as the value of the coefficient k is smaller in Example, the 4-point bending strength is higher compared to the same unstrengthened glass plate.

However, when the expression (4) is not satisfied like Example 5, it is found out that in spite of the value of the above-described coefficient k being relatively small, the 4-point bending strength is just slightly high compared to the same unstrengthened glass plate, and the 4-point bending strength is low compared to the example where the same glass plate having had strengthening performed thereon to satisfy the expression (4) was cut well. From the above, Examples 1 to 4, 6 to 22, 24, 26, and 27 each satisfying the expression (4) are more preferable examples capable of obtaining a higher 4-point bending strength.

The glass member and the manufacturing method thereof of the present invention make it possible to perform a cutting operation well on a strengthened glass plate, and further a glass plate having a resin layer formed thereon, and can be suitably used for a cover glass, a near-infrared cut filter, or the like of a semiconductor device to be built in an electronic device (for example, a device having a solid state imaging device (a CCD, a CMOS or the like).

What is claimed is:
1. A glass member comprising:
   a glass substrate comprising a strengthened principal surface and an end surface; and
   a reformed region formed on the end surface made by radiated light focused on the end surface,
   wherein the glass substrate satisfies the following expression (1):

$$\left[ a \times K_{1c} \times \left\{ \frac{2}{\pi} \left(\frac{K_{1c}}{CT}\right)^2 \times 10^6 \right\}^{\frac{3}{2}} \right]^{\frac{2}{b+1}} > 3 \times CIL, \quad (1)$$

wherein CT is a tension stress of a center portion in a tension stress region formed in a plate thickness direction inside of the glass substrate by the strengthening,
$K_{1c}$ is a fracture toughness of the glass substrate,
CIL is a crack initiation load of the glass substrate,
wherein $K_{1c}$ and CIL are a fracture toughness and a crack initiation load of the glass substrate before strengthening,
a is a positive number of from 0.4 to 7, and
b is an integer of from 2 to 7,
wherein a resin layer is formed only on one principal surface of the glass substrate, and the reformed region exists in a closer region to a principal surface side where the resin layer is formed.

2. The glass member according to claim 1, wherein the glass substrate satisfies the following expression (2):

$$\left[ a \times K_{1c} \times \left\{ \frac{2}{\pi} \left(\frac{K_{1c}}{CT}\right)^2 \times 10^6 \right\}^{\frac{3}{2}} \right]^{\frac{2}{b+1}} - \left[ a \times K_{1c} \times \left\{ \frac{1}{\pi} \left(\frac{K_{1c}}{CT}\right)^2 \times 10^6 \right\}^{\frac{3}{2}} \right]^{\frac{2}{b+1}} > 1.0, \quad (2)$$

wherein CT is a tension stress of a center portion in a tension stress region of the glass substrate,
$K_{1c}$ is a fracture toughness of the glass substrate before strengthening,
a is a positive number of from 0.4 to 7, and
b is an integer of from 2 to 7.

3. The glass member according to claim 1, wherein the glass substrate satisfies the following expression (3) under a condition of k<1, $$\left[ a \times K_{1c} \times \left\{ \frac{1}{\pi} \left(\frac{K_{1c}}{CT}\right)^2 \times 10^6 \right\}^{\frac{3}{2}} \right]^{\frac{2}{b+1}} < k \left\{ a \times K_{1c} \times \left(\frac{t}{2}\right)^{\frac{3}{2}} \right\}^{\frac{2}{b+1}}, \quad (3)$$

wherein $K_{1c}$ is the fracture toughness of the glass substrate before strengthening, CT is the tension stress of the center portion in the tension stress region of the glass substrate, a is a positive number of from 0.4 to 7, and b is an integer of from 2 to 7.

4. The glass member according to claim 1, wherein, in the tension stress region formed in the plate thickness direction inside of the glass substrate by the strengthening, the tension stress (CT) of the center portion in the tension stress region is 50 MPa to 200 MPa.

5. The glass member according to claim 1, wherein the glass substrate satisfy the following expression (4):

$$\frac{CS \times DOL}{1000} \leq 30, \quad (4)$$

wherein CS is a compressive stress of a compressive stress region formed on the surface of the glass substrate, and DOL is a depth of the compressive stress region.

6. The glass member according to claim 1, wherein the reformed region is formed in the tension stress region.

7. The glass member according to claim 1, wherein the crack initiation load (CIL) of the glass substrate before strengthening is less than 2 kgf.

8. The glass member according to claim 1, wherein a plate thickness (t) of the glass substrate is 0.1 to 0.6 mm.

9. The glass member according to claim 1, wherein the resin layer contains an infrared absorbing pigment.

10. The glass member according to claim 1, wherein the resin layer contains a visible light absorbing pigment.

11. The glass member according to claim 1, wherein the resin layer or the glass substrate has infrared absorptivity.

12. A manufacturing method of a glass member, comprising:

performing strengthening on principal surfaces of a glass plate to satisfy the following expression (1), $$\left[ a \times K_{lc} \times \left\{ \frac{2}{\pi} \left( \frac{K_{lc}}{CT} \right)^2 \times 10^6 \right\}^{\frac{3}{2}} \right]^{\frac{2}{b+1}} > 3 \times CIL \quad (1)$$

where CT is a tension stress of a center portion in a tension stress region formed in a plate thickness direction inside of a glass plate by performing strengthening, $K_{1c}$, is a fracture toughness of the glass plate, CIL is a crack initiation load of the glass plate, wherein $K_{1c}$ and CIL are a fracture toughness and crack initiation load of the glass plate before strengthening, a represents a positive number of 0.4 to 7, and b represents an integer of 2 to 7;

forming selectively a reformed region by light radiated to be focused inside the glass plate;

cutting the glass plate along the reformed region, and forming a resin layer only on one principal surface of the glass plate having had the strengthening performed thereon, wherein the reformed region exists in a closer region to a principal surface side where the resin layer is formed.

13. The manufacturing method of the glass member according to claim 12, wherein the strengthening is performed to satisfy the following expression (2), $$\left[ a \times K_{lc} \times \left\{ \frac{2}{\pi} \left( \frac{K_{lc}}{CT} \right)^2 \times 10^6 \right\}^{\frac{3}{2}} \right]^{\frac{2}{b+1}} - \left[ a \times K_{lc} \times \left\{ \frac{1}{\pi} \left( \frac{K_{lc}}{CT} \right)^2 \times 10^6 \right\}^{\frac{3}{2}} \right]^{\frac{2}{b+1}} > 1.0 \quad (2)$$

where CT is the tension stress of the center portion in the tension stress region formed in the plate thickness direction inside of the glass plate, $K_{1c}$ is the fracture toughness of the glass plate, a represents a positive number of 0.4 to 7, and b represents an integer of 2 to 7.

14. The manufacturing method of the glass member according to claim 12, wherein the strengthening is performed to satisfy following expression (3) under a condition of k<1, $$\left[ a \times K_{lc} \times \left\{ \frac{1}{\pi} \left( \frac{K_{lc}}{CT} \right)^2 \times 10^6 \right\}^{\frac{3}{2}} \right]^{\frac{2}{b+1}} < k \left\{ a \times K_{lc} \times \left( \frac{t}{2} \right)^{\frac{3}{2}} \right\}^{\frac{2}{b-1}} \quad (3)$$

where $K_1$, is the fracture toughness of the glass plate before strengthening, the CT is tension stress of the center portion in the tension stress region of the glass plate, a represents a positive number of 0.4 to 7, and b represents an integer of 2 to 7.

15. The manufacturing method of the glass member according to claim 12, wherein the tension stress (CT) of the center portion in the tension stress region formed in the plate thickness direction inside of the glass plate by performing strengthening on the principal surfaces of the glass plate is set to 50 MPa to 200 MPa.

16. The manufacturing method of the glass member according to claim 12, wherein the strengthening is performed so as to satisfy the following expression (4), $$\frac{CS \times DOL}{1000} \leq 30 \quad (4)$$

where CS is a compressive stress of a compressive stress region formed on the surface of the glass plate, and DOL is a depth of the compressive stress region.

17. The manufacturing method of the glass member according to claim 12, wherein the reformed region is formed in the tension stress region.

18. The manufacturing method of the glass member according to claim 12, wherein the crack initiation load (CIL) of the glass plate is less than 2 kgf.

19. The manufacturing method of the glass member according to claim 12, wherein a plate thickness (t) of the glass plate is 0.1 to 0.6 mm.

20. The manufacturing method of the glass member according to claim 12, wherein the compressive stress (CS) of the compressive stress region on the surface of the glass plate formed by the strengthening is 200 MPa to 800 MPa.

* * * * *